United States Patent [19]

Holender

[11] Patent Number: 5,727,051
[45] Date of Patent: Mar. 10, 1998

[54] SYSTEM AND METHOD FOR ADAPTIVE ROUTING ON A VIRTUAL PATH BROADBAND NETWORK

[75] Inventor: Wlodek Holender, Paragrafgränden, Sweden

[73] Assignee: Telefonaktiebolaget LM Ericsson (publ.), Stockholm, Sweden

[21] Appl. No.: 513,723

[22] Filed: Aug. 11, 1995

Related U.S. Application Data

[60] Provisional application No. 60/001,169, Jul. 14, 1995.

[51] Int. Cl.$^6$ ................................ H04M 15/00
[52] U.S. Cl. .................. 379/112; 379/111; 379/113; 379/220; 379/273; 370/248; 370/250
[58] Field of Search ............ 379/112–113, 220–221, 379/13–14, 11, 115, 133, 137, 201, 207, 219, 230, 188–189, 191–224, 242, 244, 268–269, 270, 271, 272, 273; 370/241–242, 244–245, 250–252

[56] References Cited

U.S. PATENT DOCUMENTS

| | | | |
|---|---|---|---|
| 5,253,248 | 10/1993 | Dravida et al. | 370/228 |
| 5,359,649 | 10/1994 | Rosu et al. | 379/113 |
| 5,430,729 | 7/1995 | Rahnema | 270/94.1 |
| 5,495,426 | 2/1996 | Waclawsky et al. | 370/229 |
| 5,502,816 | 3/1996 | Gawlick et al. | 379/220 |
| 5,519,836 | 5/1996 | Gawlick et al. | 379/220 |
| 5,521,591 | 5/1996 | Arora et al. | 379/272 |
| 5,539,815 | 7/1996 | Samba | 379/224 |
| 5,539,884 | 7/1996 | Robrock, II | 379/112 |
| 5,548,639 | 8/1996 | Ogura et al. | 379/221 |
| 5,627,889 | 5/1997 | Eslambolchi | 379/273 |

OTHER PUBLICATIONS

T. Bauschert et al.: "Network Engineering for ATM with Virtual Path", Jun. 1994.

R. Krishnan et al.: "An approach to path–splitting in multipath networks.", May 1993.

Hui: "A Congrestion Measure for Call Admission and Traffic Engineering For Multi–Layer Multi–Rate Traffic", Apr. 1990.

Joseph Y. Hui, *A Congestion Measure for Call Admission and Traffic Engineering for Multi–Layer Multi–Rate Traffic*, 3 International Journal of Digital and Analog Communications Systems 127–135 (Apr.–Jun. 1990) (Document No. XP 000564735), Jun. 1990.

Ram Krishnan & John A. Silvester, *An Approach to Path–Splitting in Multipath Networks*, 3 Proceedings of the IEEE International Conference on Communications (ICC'93), Geneva, Switzerland 1353–1357 (May 23–26, 1993) (Document No. XP 000448363), May 23, 1993.

T. Bauschert, J. Frings & R. Siebenhaar, *Network Engineering for ATM with Virtual Paths*, presented at the ATM Applications and Services session of the Conference on European Fibre Optic Communications and Networks (EFOC&N'94), Geneva, Switzerland, pp. 22–26 (Jun. 1994) (Document No. XP 000564418), Jun. 1994.

*Primary Examiner*—Curtis Kuntz
*Assistant Examiner*—Binh K. Tieu
*Attorney, Agent, or Firm*—Jenkens & Gilchrist, P.C.

[57] ABSTRACT

A general dimensioning method and system for allocating limited transmission resources to virtual paths and virtual networks on a physical network given offered traffic on each virtual path or virtual link. A hierarchical structure is defined with a layer of one or more virtual paths on top of a layer of physical network elements, and optionally, an intermediate layer of virtual networks. The virtual path dimensioning problem is solved using the Entropy Rate Function as a blocking measure. The loads on the various links are balanced by equalizing blocking probabilities and the optimal allocation of physical resources is determined.

40 Claims, 19 Drawing Sheets

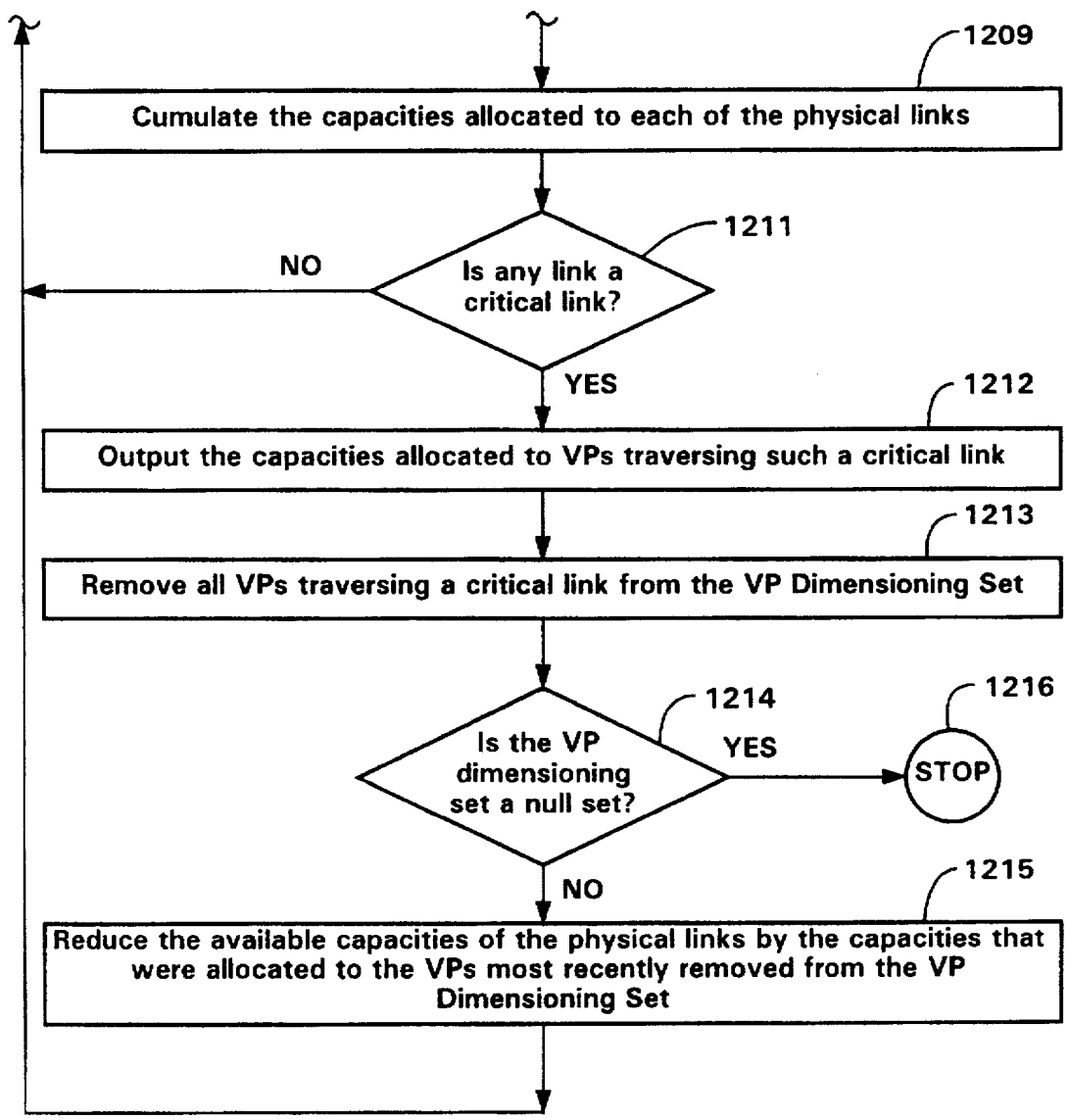

SYSTEM AND METHOD FOR ADAPTIVE ROUTING ON A VIRTUAL PATH BROADBAND NETWORK

PRIORITY UNDER 35 U.S.C. § 119(e) & 37 C.F.R. § 1.78(a)(1)

This nonprovisional application claims priority based upon a prior U.S. Provisional Patent Application entitled "Efficient Dimensioning Methods For Broadband ATM Networks With General Type of Traffic", Ser. No. 60/001,169 (Attorney Docket No. 27946-00094), filed Jul. 14, 1995, in the names of Wlodek Holender and Szaboics Malomsoky, that is also assigned to the same assignee as the present invention.

CROSS REFERENCES TO RELATED APPLICATIONS

This nonprovisional U.S. patent application contains subject matter related to copending Nonprovisional U.S. patent application Ser. No. 08/514,235, entitled "System and Method For Optimal Logical Network Capacity Dimensioning With Broadband Traffic", filed on Aug. 11, 1995 (Attorney Docket No. 27946-00093) and Nonprovisional U.S. patent application Ser. No. 08/514,480 entitled "System and Method For Optimal Virtual Path Capacity Dimensioning With Broadband Traffic", filed on Aug. 11, 1995 (Attorney Docket No. 27946-00094). These Nonprovisional U.S. Patent Applications and the disclosures therein are hereby incorporated by reference herein.

BACKGROUND OF THE INVENTION

1. Technical Field of the Invention

This invention relates to a system and method for the efficient dimensioning of a telecommunications network, and more particularly, to a technique for dimensioning defined virtual paths on a constrained physical network using the minimum time and computational resources.

2. Description of Related Art

Telephone instruments and other communications devices located in a localized geographic area are conventionally connected with one another by means of switching equipment referred to as local exchanges. Local exchanges, in turn, are interconnected by trunk exchanges. Telephone/data instruments located in geographic areas separated from one another and connected to different local exchanges communicate with one another via a complex grouping of local and trunk exchanges linked together into a telecommunications network. A telecommunication network thus comprises a plurality of interconnected network elements, such as local exchanges, trunk exchanges, mobile radio exchanges, long distance exchanges and combinations thereof. At each network level, traffic from one network element, such as an exchange, to another network element can take various routes that pass through different exchanges.

Efficient network traffic management of the communication facilities within a network requires that a sufficient number of circuits be available to handle the traffic requirements of each destination without exaggerated congestion on last-choice traffic routes. It also requires that the network congestion be as even as possible on all last-choice routes and that unused capacity within the routes which are actually provided be minimized in order to insure efficient utilization of resources. In addition, the telephone company which operates a network has a limited budget and consequently must get as much efficiency as possible out of the existing resources in each network.

In the past, traffic management within a communications network has included procedures for periodically surveying the traffic patterns within the network and changing the configuration of circuits and routes to increase the traffic handling efficiently. In addition, more routes and circuits may be added to a network in anticipation of high call densities to a particular location or a particular region and to local events within that region. Conventional network management systems are also capable of changing the relative distribution of traffic loads between selected routes within the network in order to efficiently maximize the utilization of the network without excessive degradation in the quality of service (QoS). However, conventional traffic network management systems and procedures have generally strived to increase the availability of circuits and routes within a network to handle individual traffic demands rather than to reconfigure a network by redimensioning the routes and circuits within it at a higher level of abstraction so as to maximize the overall efficiency of the network.

In addition to the inherent need to maximize the efficiency of managing physical network resources within a telecommunications system, the growth in information and communications technologies in recent years has created a wealth of new economic opportunities and managerial challenges. Vendors providing telecommunications services are continually faced with new customer demands. Providing ordinary voice communications through a telecommunications network is no longer enough. Today's users want the ability to transmit not just voice signals, but also data, audio, video and multimedia signals in both real time as well as through packet switching networks. Asynchronous Transfer Mode (ATM) technology is acquiring increasing significance due to its enhanced ability to provide broadband telecommunications facilities.

A principal feature of ATM technology is its flexibility in the utilization of network resources. One possible approach to exploit this flexibility is to partition the physical network resources, either completely or partially, into logically defined resources. For example, by partitioning a physical network into a plurality of virtual networks, the operation, maintenance and management of a physical network can be substantially simplified. By this procedure, the task of analyzing and solving the traffic routing problem for each call over an entire physical network can be reduced to the considerably simpler routing problem on each virtual network. Each of the individual virtual networks have less complexity than the entire physical network as a whole, making the solution of the traffic routing problem easier.

Partitioning of physical resources can also be necessitated by the existence of different traffic types, different classes of service or varying traffic demands within leased networks. Instead of providing a separate physical network for each customer application, a service provider can set up a number of virtual networks defined on top of a single common ATM physical infrastructure.

This new flexibility in the configuration of virtual network structures demands efficient dimensioning tools, methods and algorithms. Since the nature of the telecommunications services that will be offered in the future are hard to predict, any dimensioning method that is used to manage the configuration of virtual network resources must be capable of dealing with all types of broadband traffic. If the configuration of a virtual network has to be frequently revised in order to adapt to changes in the pattern of offered traffic, then the computational efficiency of the network redimensioning and configuration control system also needs to be high. An algorithm selected for performing network redimensioning and reconfiguring a network should perform its calculations in a time period that is much shorter than the time duration of each virtual network.

Many existing dimensioning techniques are excluded by the requirement that the dimensioning technique be capable of modeling a general traffic distribution. Most commonly used dimensioning methods are not capable of handling general traffic models because of limitations arising from the use of the Erlang blocking measure. The method and system of the present invention overcomes these disadvantages.

SUMMARY OF THE INVENTION

It is therefore an object of this invention for a user to be able to dimension a network using a general traffic distribution model. It is a further object of this invention to be able to perform the dimensioning calculations using a minimum of computational resources. Another object of the present invention is to implement a dimensioning algorithm that has low computational complexity, and consequently, higher speed. Yet another object of this invention is to be able to perform the redimensioning calculations in as short a period of time as possible. It is a further object of this invention to increase the efficiency of the virtual network dimensioning and the virtual path dimensioning processes.

Given a physical network comprising a plurality of physical links, where each physical link has a prespecified transmission capacity, the system and the method of the present invention illustrates a dimensioning technique that supports a general traffic model. The dimensioning task is treated as a load balancing problem over the various physical links. The optimal solution to the virtual path dimensioning problem corresponds to that choice of allocated capacities over the various virtual paths wherein the blocking on each of the virtual paths is made as uniform as possible over the various links.

In one aspect, the present invention includes a method for efficiently dimensioning a telecommunications network having a plurality of physical links that interconnect a plurality of exchanges or nodes. A plurality of physical links are related to one or more virtual paths. Each of the virtual paths provide an individually switchable connection between a pair of exchanges or nodes in the telecommunications network. Offered traffic is specified for each of the virtual paths and a transmission capacity constraint is set for each physical link of the telecommunications network. The relationship between offered traffic and other computational parameters is modeled on the telecommunications network using an entropy-blocking measure and capacities are allocated to the plurality of virtual paths subject to the transmission capacity constraints for the various physical links such that the blocking probabilities on the various virtual paths are made as uniform as possible within a preselected error bound.

BRIEF DESCRIPTION OF THE DRAWINGS

A more complete understanding of the method and system of the present invention may be obtained by reference to the detailed description of the preferred embodiments that follows, taken in conjunction with the accompanying drawings, wherein.

DESCRIPTION OF THE PREFERRED EMBODIMENT

Congestion Control Within Conventional Networks

Figure 1:
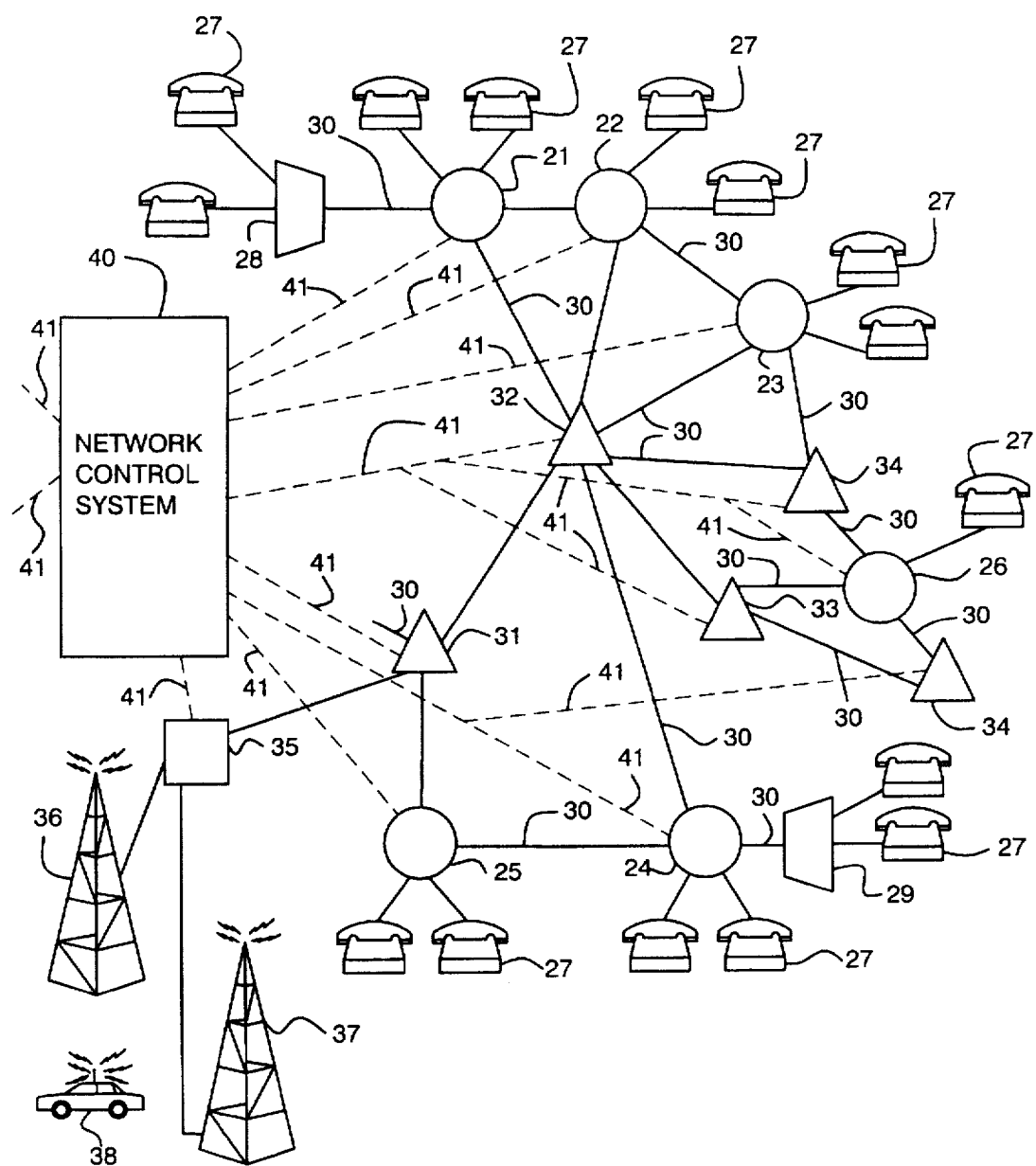
FIG. 1 is a block diagram of an illustrative telecommunications network within which virtual path dimensioning may be effected.

Turning first to FIG. 1, there is shown an illustrative schematic diagram of a conventional public telecommunications network including a plurality of local exchanges 21 to 26, each of which have a plurality of local subscribers connected thereto and represented by telephone instruments 27. Two of the local exchanges 21 and 24 are represented as having remote subscriber multiplex stages 28 and 29 associated therewith which, in turn, have local customers 27 connected thereto. The network of FIG. 1 also includes a plurality of trunking exchanges 31 to 34 which serve primarily to interconnect various local exchanges with one another and to provide routes between various parts of the network. Trunk exchange 31 is shown connected to a mobile exchange 35 which includes a pair of illustrative base stations 36 and 37 serving a plurality of mobile radio telephone subscribers represented at 38. In addition, other telecommunications services such as databases and intelligent networks may also be connected to various ones of the exchanges shown. Between each of the exchanges 21 to 35 in the network, there are shown a plurality of communication paths 30, each of which may comprise a plurality of communication circuits, including cables, optical links or radio links for carrying voice and/or data communication between the various exchanges within the network.

The network of FIG. 1 also includes a network control system 40 which is connected to each of the exchanges 21 to 35 within the network by means of communication links 41 (represented by dotted lines) for the transmission of control signals to each exchange and for the reception of traffic data from each exchange. The network control system 40 issues commands to dynamically reconfigure the communication paths within the various traffic routes of the network as well as to control the alarm systems within the exchanges of the network in order to fine tune the alleviation of congestion conditions within the network.

ATM System Concepts

Numerous changes are currently taking place within public telecommunications transport networks which are being implemented. One of the major goals for operators of public telecommunications networks has been to deploy a single type of technology to handle the transport and switching of all types of telecommunications services within a common infrastructure. One such technology is the Asynchronous Transfer Mode (ATM) technology.

ATM is currently being implemented in an attempt to satisfy these needs by creating a bearer telecommunications network which has substantial "bandwidth granularity" and which is capable of coping with very high bandwidth connections. The term "bandwidth granularity" refers to a characteristic of a network in which the bandwidth required by a call can vary freely throughout the duration of the call.

The use of ATM technology in the public telecommunications network provides the capabilities of common switching and transport for related services, increased bandwidth granularity, support of variable-bit-rate services, and support of multimedia services. Because of these features, ATM has been chosen by the International Telegraph and Telephone Consultative Committee (CCITT) as the core technology for broadband ISDN (B-ISDN) services. This is despite the disadvantages of ATM, including transit delays for low speed isochronous services, added complexity within a network, and the introduction of new performance parameters (such as cell-loss and congestion), with which the system of the present invention deals, as will be further set forth below.

An ATM network may be implemented using either plesiochronous digital hierarchy (PDH) or synchronous digital hierarchy (SDH), or both. Moreover, pure ATM may be used as the bearer for a network whenever the limitations arising from multiple conversions between ATM and STM (synchronous transfer mode) and the resultant performance degradations can be dealt with.

Figure 2:
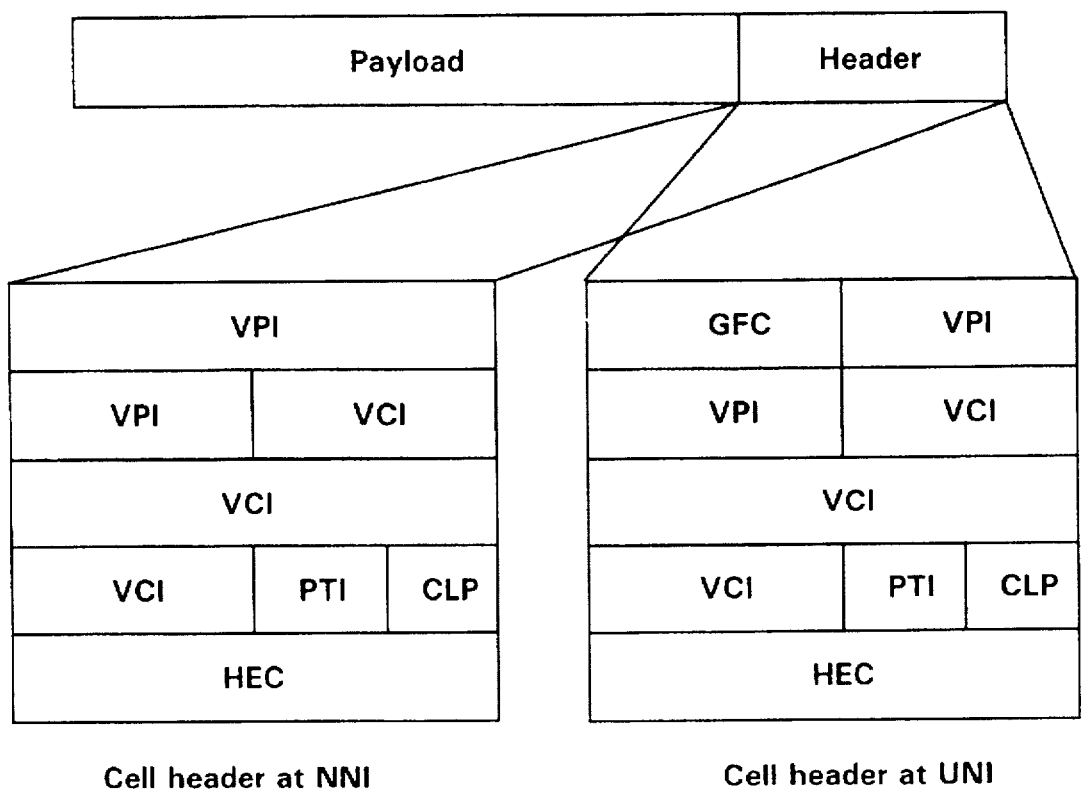
FIG. 2 is a block diagram illustrating exemplary ATM cell structure.

The ATM cell structure shown in FIG. 2 is at the heart of ATM technology. An ATM cell has a fixed length of 53 bytes, or octets, divided into a 5-octet header and a 48-octet information field (also known as the payload). The ATM cell header is structured as a number field and one of its main functions is to assist in routing the ATM cell from the point of origin to the point of destination through one or more switching nodes. The information held in each ATM cell is kept relatively small in order to reduce the size of the internal buffers in the switching nodes and to limit the queuing delays in those buffers. ATM operates in a connection-oriented mode. This is important from a modeling viewpoint since it makes it possible to use the results of well-established circuit-switched mathematical models to optimize the allocation and control of network resources.

The principal function of the ATM cell header is the identification of the virtual connection. Routing information within the ATM cell is contained within two fields: a virtual path identifier (VPI), which determines which virtual path the ATM cell belongs to, and a virtual channel identifier (VCI), which determines which virtual channel in the virtual path the cell belongs to.

A virtual channel is a dynamically allocable end-to-end connection. Optical transmission links are capable of transporting hundreds of megabits per second, whereas virtual channels may fill only a few kilobits per second of a link. Thus, a large number of simultaneous virtual channels can be supported on a single transmission link.

A virtual path, on the other hand, is a semi-permanent connection between endpoints. Each of virtual paths can transport a large number of simultaneously-connected virtual channels. Since a large group of virtual channels are handled and switched together as a single unit, the total processing requirements of a virtual path are less than that of a virtual circuit, and consequently there is faster processing per (virtual) circuit, resulting in a significantly more efficient use of network resources. The network management of virtual paths is relatively simple and efficient.

As illustrated in FIG. 2, the ATM cell header is slightly different at the user-network interface (UNI) compared with the network-node interface (NNI). The UNI contains four bits for generic flow control (GFC) and is used to ensure fair and efficient use of available capacity between a terminal and the network. A payload type indicator (PTI) field is used to indicate whether an ATM cell contains user information or special network information, e.g., for maintenance purposes. A cell loss priority (CLP) field encodes a two-level priority and is used when it becomes necessary to discard cells because of network conditions. The header information is protected by a check sum contained within the header error control (HEC) field.

The use of ATM cells permits the information transfer rate to adapt to the actual service requirements. Depending upon the capacity required, the number of cells per unit of time can be increased up to the transmission bit-rate limit of the physical medium used to carry the data. In addition to data cells there are also cells for signaling and maintenance and idle cells. Signaling cells are used between an end user in the network, or between nodes in the network and their function is to setup a service, e.g., a connection. Maintenance cells provide supervision of the ATM layer while idle cells are used to fill the transmission capacity up to the rate of the transmission medium.

Figure 3:
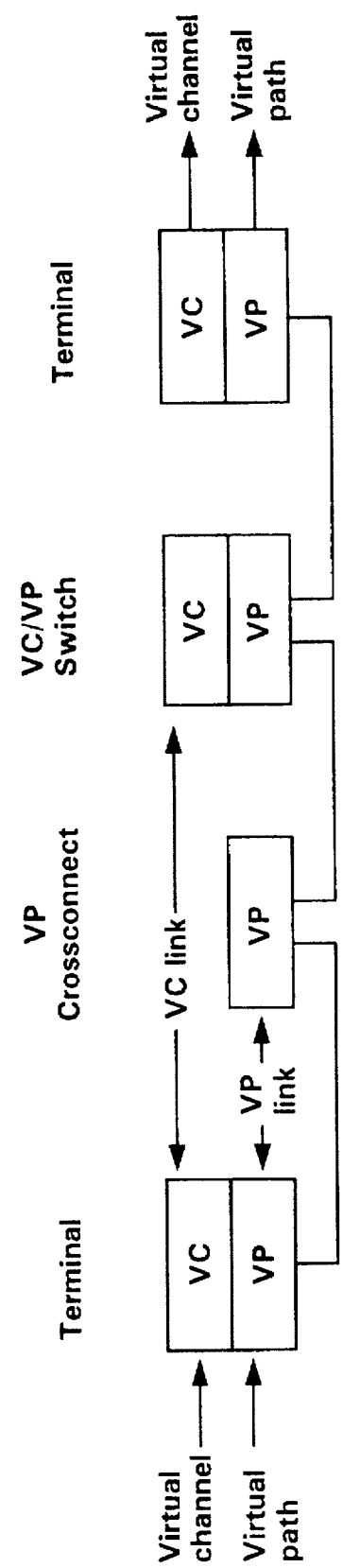
FIG. 3 is a block diagram illustrating a number of interconnected virtual paths and virtual channels within an ATM network.

Referring to FIG. 3, there is shown a block diagram illustrating the switching and cross-connection of virtual channels and virtual paths within an ATM link. From the viewpoint of a switch designer, "VP switching" refers to the switching of an ATM cell using only the upper part of the identifier field, that is, the shorter field (VPI). In contrast, in "VP/VC switching" the entire identified field is used (both VPI and VCI). A VP/VC path consist of a plurality of interconnected VP/VC lengths. Switching and cross-connection can be performed at either the VP or the VC level. The virtual path identifier (VPI) and the virtual channel identifier (VCI) define a two-tier handling and routing structure within the ATM circuitry. From the network architectural standpoint, a virtual path (VP) is a bundle of individual connections, a type of "highway" in the route map of an ATM network. One important task in network management is to allocate the right amount of transmission capacity to each such highway (i.e., a virtual path) in order to optimize network performance. This optimization task is the objective of bandwidth management or virtual path dimensioning techniques and is the subject matter of one aspect of the present invention as further discussed below.

Figure 4:
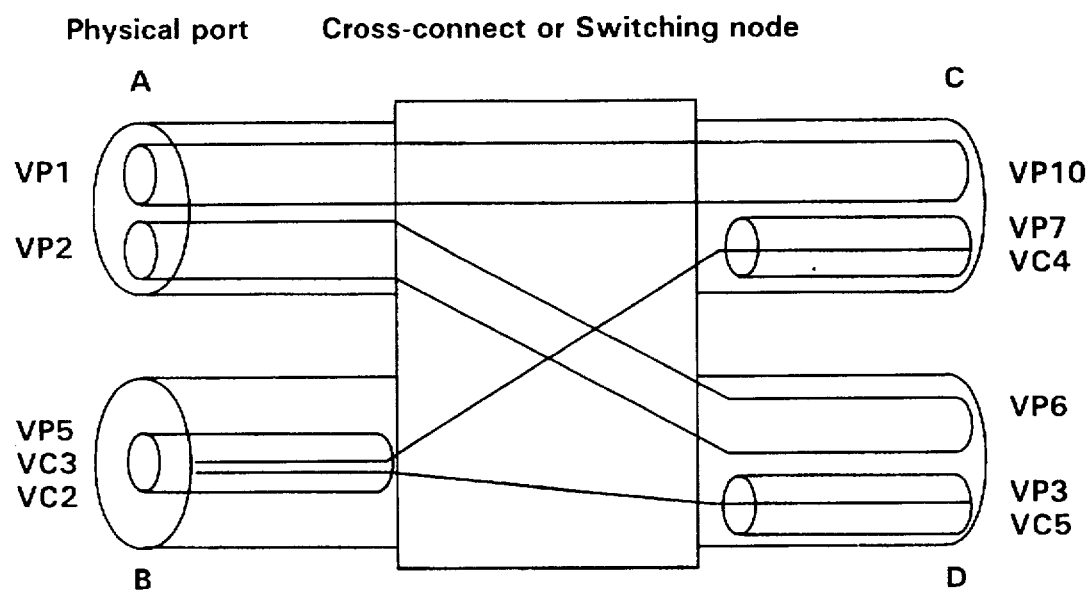
FIG. 4 is a block diagram illustrating the cross-connection and switching of virtual paths and virtual channels within an ATM network.

Referring next to FIG. 4, there are illustrated the concepts of virtual path and virtual channel cross-connection and switching. The virtual path identifier (VPI) and virtual channel identifier (VCI) values are only valid for a specific link. In each cross-connect/switch, new VPI/VCI values are assigned to the cell with the combination of physical port and VPI/VCI values providing the identification for the ATM cell. The routing of an exemplary ATM cell is then performed, with the aid of translation tables such as that illustrated in TABLE 1, as follows:

TABLE 1

| CONNECTED-FROM PORT | VPI | VCI | CONNECTED-TO PORT | VPI | VCI |
|---|---|---|---|---|---|
| A | 1 | — | C | 10 | — |
| A | 2 | — | D | — | — |
| B | 5 | 3 | C | 7 | 4 |
| B | 5 | 2 | D | 3 | 5 |

An ATM cell is the basic multiplexing unit within an ATM transport system, with each cell or information unit containing its own connection and routing information. This feature enables direct multiplexing or demultiplexing of service channels wherein each channel may carry different bit-rates. Each ATM cell is identified and routed by information contained in the header within the virtual path identifier (VPI) and virtual channel identifier (VCI) fields. As mentioned above, a virtual path (VP) is a bundle of multiplexed circuits between two termination points, e.g., switching systems, Local Area Network (LAN) gateways, or private network gateways. A VP provides a direct logical link between virtual path terminations, with the VPI value identifying the particular virtual path.

As also mentioned above, the virtual path concept used within ATM technology allows multiple virtual channels (VCs) to be handled as a single unit. Virtual channels with common properties, e.g., the same quality of service (QoS), can be grouped together in bundles that can be transported, processed and managed as one unit. This flexible bundling simplifies the operation and maintenance of an ATM system.

Both virtual paths and virtual channels can be used to provide semi-permanent paths within the ATM network. Routes are established and released from an operation support system by the setting of "path connect tables" in the cross-connect equipment or in the multiplexers along a path. Virtual channels can also be used for on-demand switching with connections being established by signaling either between a user and the network or within the network.

One important characteristic of ATM technology relates to its protocol architecture and is built around the so-called "core-and-edge" principle. The protocol functions specific to the information type being transported, such as retransmissions, flow control, and delay equalization, are performed in terminals at the "edges" of the ATM network. This leaves an efficient, service-independent "core" network, that only includes simple cell-transport and switching functions. Within the ATM nodes in this core, there are no error checks on the information field nor are there any flow controls. The cell information is simply read, the HEC is then used to correct single-bit errors that might affect the address and the cell is then switched towards its destination.

Figure 5:
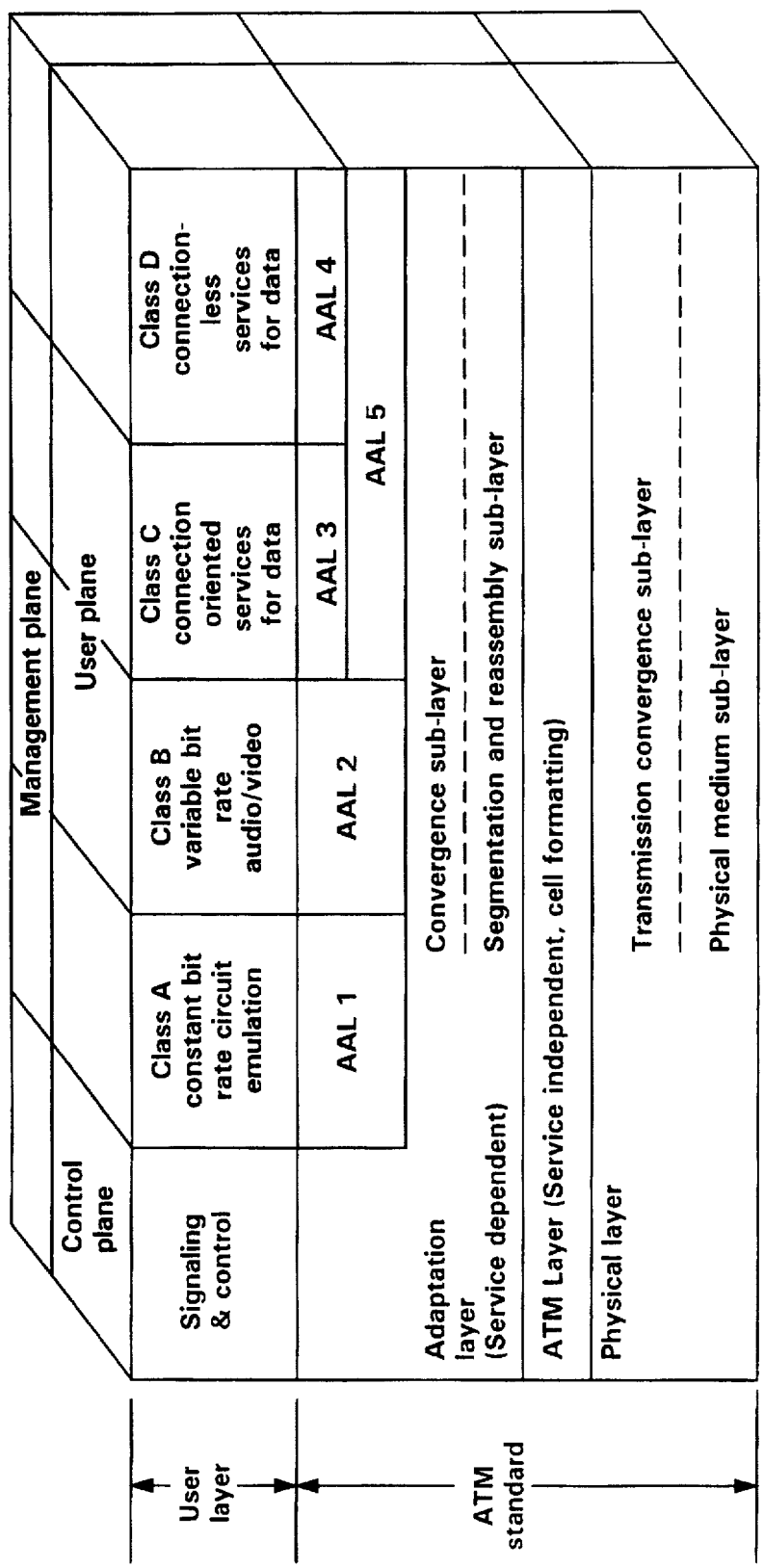
FIG. 5 is a diagram illustrating the CCITT B-ISDN reference model showing the variety of service classes supported and the layers of the standard.

An ATM adaptation layer (AAL) is used at the edge of the network to enhance the services provided. As shown in FIG. 5, the CCITT reference model for B-ISDN services envisages that the AAL includes service dependent functions. As depicted in FIG. 5, there are three layers in the ATM standard. The first layer is the physical layer defining the physical interfaces and framing protocols. The second ATM layer is independent of the physical medium chosen and defines cell structure, provides multiplexing and demultiplexing and VPI/VCI translation to control the flow of cells within the logical network. The third layer is the AAL which provides the important adaptation between the service and the ATM layer thereby allowing service-independent ATM transport. The AAL performs mapping between the original service format and the information field of an ATM cell. Exemplary functions provided by the AAL include variable-length packet delineation, sequence numbering, clock recovery and performance monitoring.

Deployment of ATM in Telecommunications Networks

One use of ATM technology can be used within customer premises to support high speed data communications in and between customer local area networks. In addition, ATM can be used as an infrastructural resource that is common to all services within a customer premises network, including voice and video communications, data transfers and multimedia applications.

An exemplary service for which ATM nodes are introduced into a public telecommunications network is to provide virtual leased line (VLL) service. VLL service is based upon a virtual path concept and allows line capacity to be directly tailored to customer needs and easily changed without modifying the interface structure. A large number of logical connections can be offered to a user through user-network interfaces (UNIs). In addition, a custom tailored quality of service can also be offered to a customer, matching the needs of the user. Thus, multiple classes of service, quality of service classes and performance parameters can be selected. For example, voice services require low transmission delays but can tolerate high bit-errors, while data communications, on the other hand, are more tolerant of network delays but are sensitive to bit-errors. Thus, the quality of service level of a particular application can be contractually agreed to between a service provider and a customer and audited manually or automatically to ensure compliance.

Figure 6:
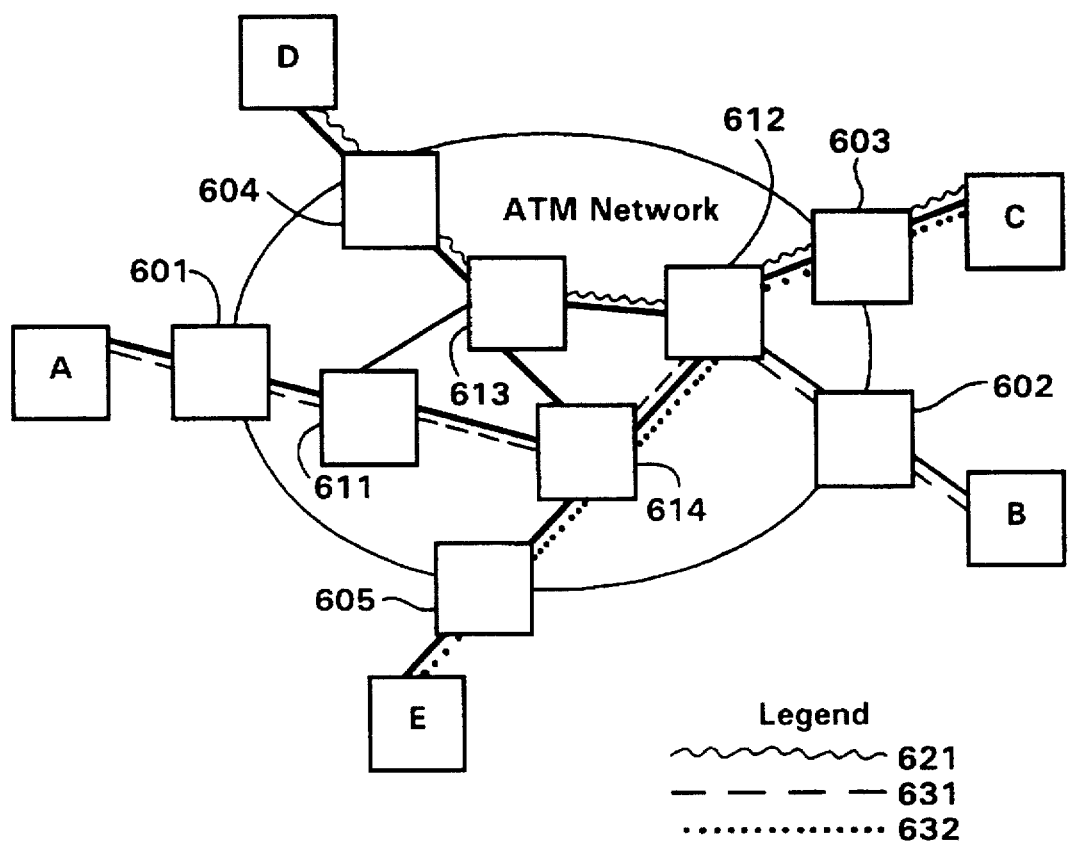
FIG. 6 is a diagram showing an illustrative ATM network providing virtual leased line (VLL) service.

As shown in FIG. 6, there is an exemplary virtual channel based VLL service implemented within a ATM network. Network terminals A to E are each coupled through flow enforcement nodes 601 to 605, respectively, to ATM cross-connect nodes 611 to 614. The ATM network consist of a plurality of ATM cross-connects 611 to 614 which can provide routing both at the virtual path as well as at the virtual channel level. The flow enforcement functions 601 to 605 are located at the edge of the ATM network to protect the network against potential overloads. This function ensures that no connection violates the conditions agreed-to when the connections are setup. Additional services can be implemented by adding services to one or more of the cross-connect nodes 611 to 614. Within the network of FIG. 6, an exemplary virtual path is illustrated by the wavy line 621 between terminal C and D. A first virtual connection between terminals A and B is illustrated by the dashed line 631 while a second virtual connection is illustrated by the dotted line between terminals C and E, as illustrated by the dotted line 632.

In addition to the virtual leased line network shown in FIG. 6, other services, such as SMDS/CBDS and frame relay, can easily be added depending upon demand by connecting servers to the ATM nodes within the network. In residential areas, ATM technology can be used to provide new and enhanced entertainment services such as on-demand video to the end user. The flexibility of an ATM network makes it possible to support a multitude of services, such as long distance education, home shopping, and games.

Figure 7:
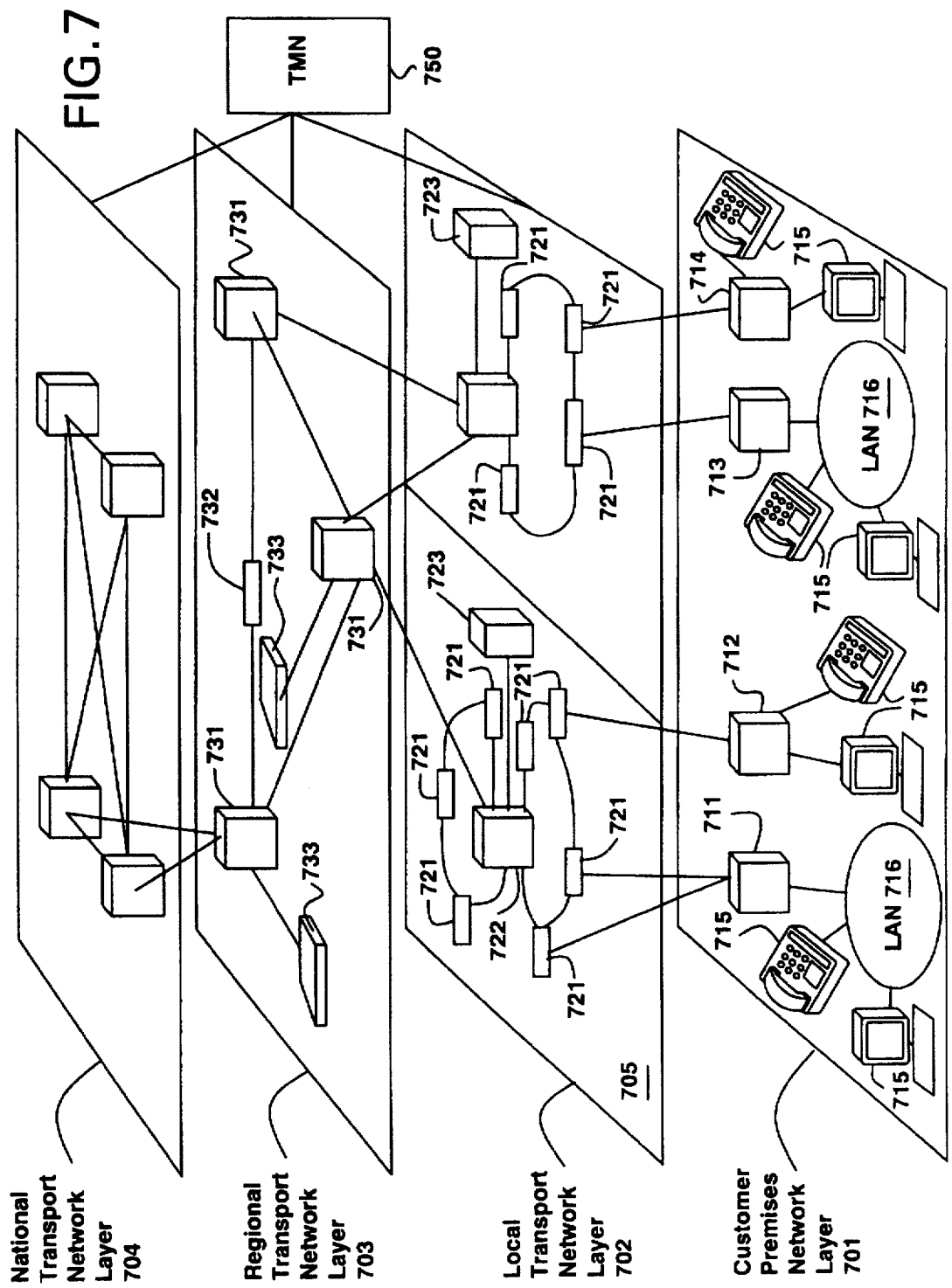
FIG. 7 is a diagram illustrating a multi-layered SDH-based transport network which includes ATM cross-connects.

FIG. 7 illustrates an ATM network which has been overlaid upon a SDH-based layered transport network. The layers include a customer premises network layer 701, a local transport network layer 702, a regional transport network layer 703 and a national transport network layer 704. A plurality of ATM business network nodes 711 to 714, control the flow of data from the customer premises terminals 715 and LANs 716 into respective ones of a plurality of add-drop multiplexers (ADM) 721 serving SDH cross-connect nodes 722 within the local transport network 705. The local cross-connect nodes 722 are in turn coupled through regional cross-connect nodes 731 in the regional transport network, two of which are coupled by add-drop multiplexers 732. Within the local transport network layer 702, a pair of ATM access nodes 723, and SDH rings, comprising the add-drop multiplexers 721, serve the cross-connects 722 and are used for subscriber access with a capacity of up to a full STM-1 (155 megabits per second), the standardized access rate for B-ISDN services.

Existing traffic such as Plain Old Telephone Service (POTS) can also be carried on this ring network, with remote multiplexers and other access nodes providing the final local-loop connection. The ATM access nodes 723 are shared for access to different services from one location and can include both voice and data using different VP/VCs. In the ATM access nodes 723, ATM traffic is concentrated to make more efficient use of the transport capacity.

The size of a ATM access node can vary, depending upon the capacity required, from a small multiplexer to a large cross-connect. In the regional transport layer 703, ATM cross-connects 733 are used to route traffic between local areas. In the national transport network layer 704, illustrated in FIG. 7, ATM is not visible. In an ATM overlay network, in place as illustrated in FIG. 7, services such as frame relay and SMDS/CBDS are easily added. Functionality for B-ISDN can also be added to both access and regional nodes by adding appropriate software and hardware. As also illustrated in FIG. 7, a network management system 750, such as one operating in accordance with the TMN standard of the CCITT can be implemented to provide the necessary network management functionality to both the SDH and ATM elements of the network.

The management of the ATM network by subsystem 750 may be implemented in accordance with the telecommunications management and operations support (TMOS) family of network management systems provided by Telefonaktiebolaget LM Ericsson, the assignee of the present application. Such network management may include various functionalities such as routing algorithms and congestion control implemented in accordance with the teachings of the present invention as set forth in detail below.

Virtual Path Capacity Dimensioning

A useful model in dimensioning a telecommunications network is to treat the dimensioning problem as involving a two-layered structure consisting of a first physical network layer, with discrete topology and specified link capacities and a second virtual path layer with virtual paths and their particular routings. A traffic demand is offered to the virtual paths in this model. In dealing only with the task of dimensioning network capacity, the virtual paths are, ipso facto, already routed. Each virtual path may travel through numerous physical links but will emulate a highway comprising only a single path. Each virtual path will have one characteristic blocking value and one characteristic allocated capacity value with only as many variables in the model as there are virtual paths.

The term "offered traffic" is used to refer to the time varying demand for transmission capacity along each virtual path. The term "traffic demand" is used to indicate the time-averaged value of the offered traffic for each link. When the characteristics of the traffic on an ATM network can be modeled by a single-parameter Poissonian distribution, the traffic is termed as homogenous single-class traffic. When the offered traffic is non-homogeneous, it is usually modeled using a multi-class Poissonian distribution.

The offered traffic can also be modeled by a normal distribution. This is referred to as normal traffic. Finally, network dimensioning can also be based upon actual traffic as determined by measurements.

The transmission requests of a multitude of users can be combined into an aggregated traffic stream. For example, several users could be sending messages from Dallas to Stockholm contemporaneously. Instead of managing these multiple transmissions individually, it is more efficient to combine and transmit them as a group over a broadband trunk line. As discussed above, a virtual channel is a dynamically allocable end-to-end connection. A virtual path is a logical construct that allows multiple virtual channels to be handled and switched together as a single unit. This unified switching reduces the processing requirements overall and also speeds up the transmissions. Since the management of a virtual path is both simpler and more efficient than the management of virtual channels or individual physical circuits, a significantly improved utilization of network resources can be obtained by this technique.

The Virtual Path Dimensioning Model

The basic model that is considered is that of a connection-oriented network that is operating under a fixed routing. If we define the physical network as comprising a set J of arbitrarily connected links, then each virtual path (VP) or route r is an ordered list whose elements are a subset of J. The relationship between the virtual paths and the physical links can be defined in terms of a routing matrix, $\chi$, whose elements are:

$$\chi_{j,r} = \begin{cases} 1 & \text{if } j \in r \\ 0 & \text{otherwise} \end{cases} \quad \text{(EQN. 1)}$$

Figure 8:
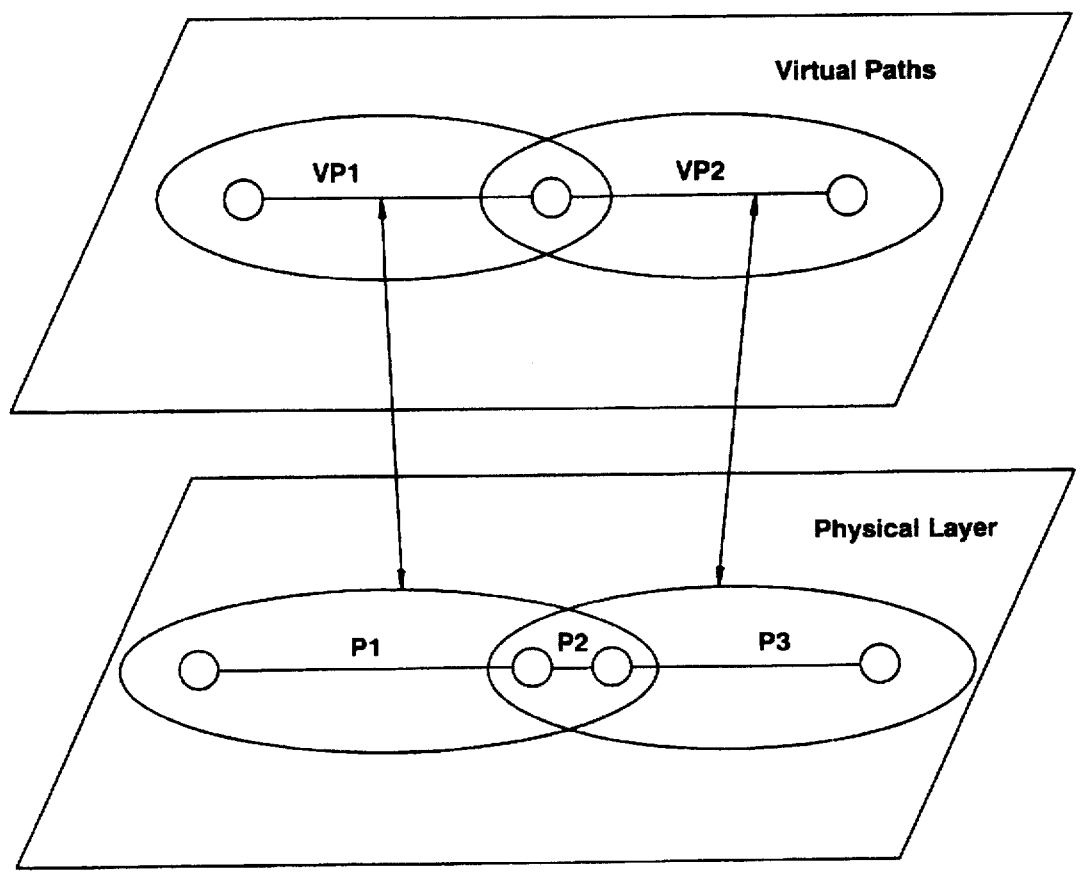
FIG. 8 is a diagram illustrating the topological relationship between virtual paths and physical links.

FIG. 8 illustrates the topological relationship between virtual paths and physical links. In FIG. 8, virtual path, $VP_1$, consists of physical links $P_1$ and $P_2$, and virtual path, $VP_2$, consists of physical links $P_2$ and $P_3$.

The quantitative relationship between the capacities allocated to various VPs and the corresponding capacities allocated on physical links is given in matrix form as:

$$\chi C_{VP} = C_{phys} \quad \text{(EQN. 2)}$$

where $\chi$ is a routing matrix of the type defined in Equation (EQN. 1) above, $C_{VP}$ is the virtual path capacity vector and $C_{phys}$ is the physical link capacity vector.

The physical link capacity vector, $C_{phys}$, representing the capacities that have been allocated to the various VPs, cannot exceed the available physical capacities on any of the physical links. This limitation can be expressed by the simple constraint relation:

$$\chi C_{VP} = C_{phys} \leq \bar{C}_{phys} \quad \text{(EQN. 3)}$$

where $\bar{C}_{phys}$ is a vector describing the available physical capacities on each of the K physical links. Since Equation (EQN. 3) is a vector inequality, it is important to note that corresponding components of both vectors have to satisfy this inequality. For the simple example shown in FIG. 8, the routing matrix $\chi$ is:

$$\begin{bmatrix} 1 & 0 \\ 1 & 1 \\ 0 & 1 \end{bmatrix} \quad \text{(EQN. 4)}$$

where the relation between virtual paths capacities and corresponding physical link capacities allocated to VPs is:

$$\begin{bmatrix} 1 & 0 \\ 1 & 1 \\ 0 & 1 \end{bmatrix} \cdot \begin{bmatrix} C_1 \\ C_2 \end{bmatrix}_{VP} = \begin{bmatrix} C_1 \\ C_1 + C_2 \\ C_2 \end{bmatrix}_{phys} \quad \text{(EQN.5)}$$

where $$\begin{vmatrix} C_1 \\ C_2 \end{vmatrix}_{VP}$$

is the virtual path capacity vector and $$\begin{vmatrix} C_1 \\ C_1 + C_2 \\ C_2 \end{vmatrix}_{phys}$$

is the allocated vector for the physical links.

The call request process to a given route r can be any stationary process for which we know the fictitious occupancy distribution if the process were to be provided with a resource having infinite capacity that accepted all calls and avoided all blockage. $X_r$ denotes the occupancy level of this fictitious infinite capacity resource, and is commonly referred to in the art as "offered traffic".

The virtual path dimensioning problem is defined in the system and method of the present invention as having two objectives. First, the transmission capacity allocated to each virtual path needs to be optimized so as to minimize a transmission cost function. Second, for every physical link, the capacities allocated to the various virtual paths traversing this link must not exceed the physical transmission capacity constraint of that physical link.

The physical capacities that can be allocated to the various virtual paths can be approximated by a continuous function that assumes any real value in the range [0, $\bar{C}_{phys}$]. Consequently the resource optimization task does not require discrete optimization and all of its attendant complexities. In the dimensioning problem addressed in this application, load sharing between different VPs has not been considered. The offered traffic is assumed to be defined for each virtual path. Further, because the network has fixed routing, the routing of the offered traffic is fixed by the choice of the virtual paths.

The "Push Down" Dimensioning Technique

The virtual path dimensioning task is viewed in the present invention as a load balancing problem in which the "load" is the value of an appropriate chosen blocking measure and where the optimal solution corresponds to that choice of allocated VP capacities wherein the blocking on each of the virtual paths is distributed in as uniform a manner as possible. One way to make the blocking distribution uniform is to measure the divergence in the values of the blocking on the various virtual paths and then to minimize this divergence. This approach can be implemented using any standard minimization algorithm, for example, the well-known simulated annealing technique.

A related approach would be to first identify the virtual path having the highest blocking value and then to minimize the blocking for this virtual path by reallocating capacity from other VPs until the virtual path is no longer the VP with the highest blocking. This formulation corresponds to a min-max optimization problem and can be analytically formulated as described below.

If we denote the blocking on the $i^{th}$ virtual path as $B(VP_i)$, then the VP that has the largest blocking is $\max(B(VP_i))$ where the maximum is taken over all the VPs. The maximum of a blocking measure over the set of virtual paths defines the objective function (also known as the cost function) for the VP dimensioning problem. The goal of the optimization procedure therefore, is to find the minimum of the objective function, which corresponds to:

$$\min \max (B (VP_i)) \quad \text{(EQN. 6)}$$

where the minimum is defined over all feasible configurations.

Since this technique involves pushing down the highest blocking value among all the VPs considered, an algorithm using this technique to solve an optimization problem is called an "Push Down" algorithm. This algorithm follows from the fact that the uniform blocking distribution corresponds to the best solution of the unconstrained VP dimensioning problem. Accordingly, the best solution is to allocate capacities to each VP such that the blocking on each of the VPs is made equal within an error bound. However, such a solution is not always realizable because of the capacity constraints of the various physical links. The limited capacity of a physical link needs to be shared amongst all VPs traversing that physical link.

Figure 9:
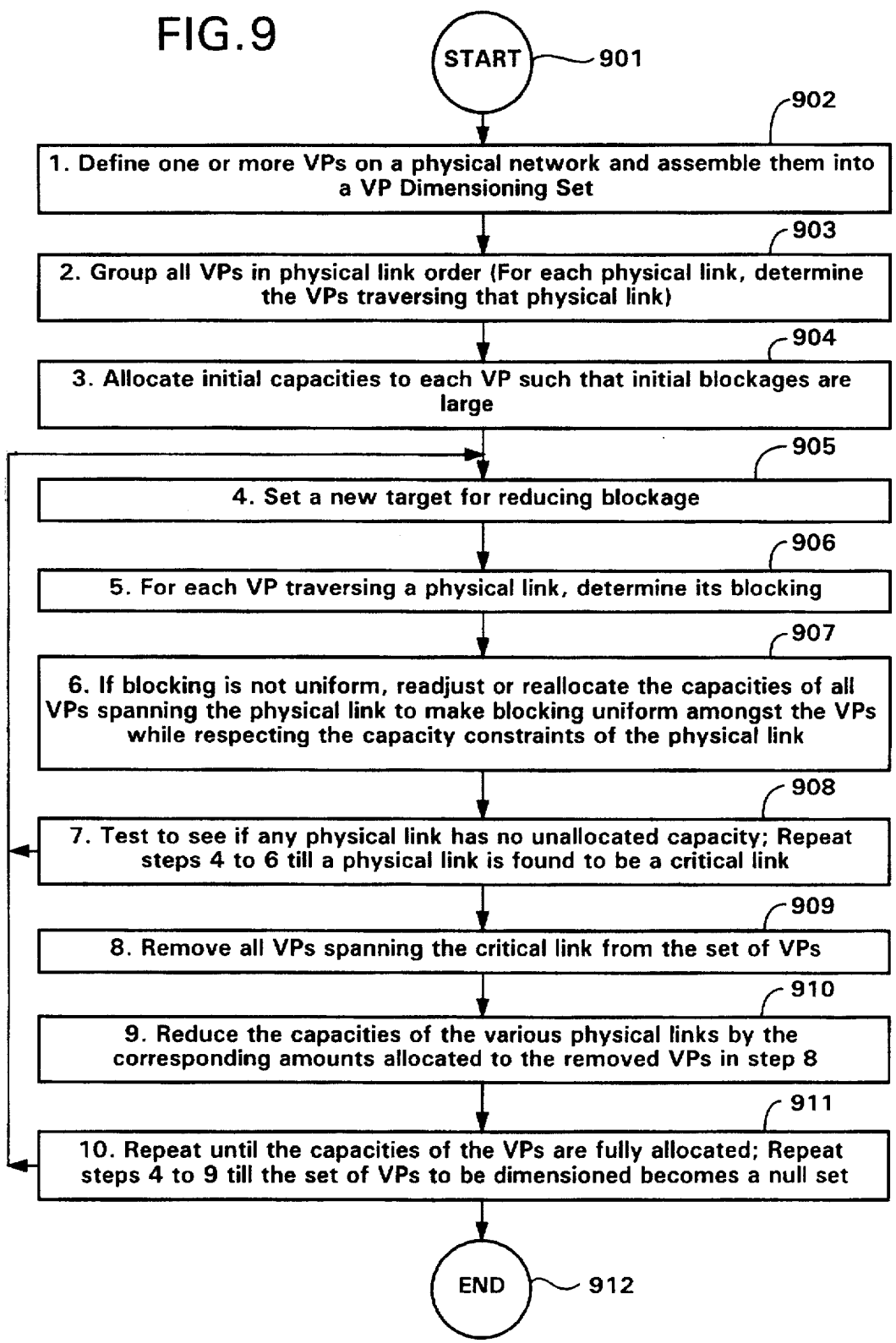
FIG. 9 is a flow chart depicting the various steps of an illustrative Push Down algorithm for dimensioning virtual paths defined on a physical network.

FIG. 9 shows the various steps in one illustrative embodiment of a Push Down Algorithm for dimensioning virtual paths defined on a physical network. The dimensioning process starts at 902 with the definition of the connection topology of the various VPs. The various VPs are also assembled into a VP Dimensioning Set. The VPs are then grouped at 903 in order of the physical links that they each traverse. Initial allocations of transmission capacity are then made to each VP at 904. At 905, a target figure for reduction in blocking is chosen. To set a target, one needs to first select a blocking measure. In one preferred embodiment of the present invention, the Entropy Rate Function, as detailed in the sections following, is used as a blocking measure. The target value is used to set termination conditions for the dimensioning algorithm.

The blocking on each of the VPs is determined at 906 over each of the physical links. If the various VPs traversing a single physical link do not face the same or similar levels of blocking, then the capacities currently allocated to each of the VPs are revised at 907 so as to equalize the blocking values for the VPs within an error bound. Capacity can be added to VPs by the allocation of unallocated physical capacity or by reallocation of already allocated capacity from a less productive VP to a more productive VP. This capacity readjustment is performed without violating the capacity constraints of any of the physical links.

This process results in the identification at 908 of one or more physical links as being the bottle-necks in this optimization procedure. A physical link on which the VP blockage is the highest and whose blockage is not reducible by capacity reallocation is referred to as a critical link. Each critical link determines the lowest blocking that can be achieved on VPs traversing that physical link. One of the principal tasks of the Push Down algorithm is to identify, at each stage of the optimization procedure, the set of critical links for a given set of virtual paths.

Once a critical link is identified at 908, physical capacities can be reallocated between the various virtual paths traversing this critical link in such a way as to equalize the blocking values for each of the virtual paths. It should be noted that when a physical link is found to be a critical link, ipso facto, it has no unallocated capacity. Consequently, only reallocation of capacity between VPs passing though a critical link is possible after the algorithm reaches this stage of the dimensioning procedure.

Next, at 909, VPs with allocated capacities are removed from the set of all the VPs that still need to be dimensioned. Correspondingly, at 910 the available physical link capacities are reduced by the allocated capacities of the VPs that were removed in the previous step.

The dimensioning problem thus reduces to the optimization problem of minimizing the highest blocking probability for the remaining set of VPs. This permits the use of a recursive re-entrant algorithm to implement this procedure.

The blocking values from the previous step are now used as the initial values in the remaining dimensioning problem. This optimization procedure is recursively repeated at 911 until all the capacities of each of the physical links have been allocated. In summary, this greedy-type algorithm starts with dimensioning the complete set of all VPs and terminates at 912 when the set of virtual paths remaining to be dimensioned becomes a null set.

It should be emphasized that the execution of every dimensioning algorithm of the type detailed herein need not identically follow the order of steps as depicted in FIG. 9. The execution order of some of the steps of the dimensioning algorithm may be different from that shown in FIG. 9 based on implementation details and convergence considerations.

The problem of analytically identifying the critical link in a given set of VPs, has proven to be a difficult task. There are no known techniques for determining the critical link directly from the offered traffic and the physical link capacity constraints. Hence the push down algorithm employs an iterative approach to identify critical links. The algorithm is initialized for all VPs by using a uniform large blocking value for all the VPs. The initial blocking value that is selected has to be large enough so that the sum of the initially allocated values of the VP capacities do not exceed the available physical capacities of the various physical links.

By the slow and uniform reduction in the degree of blocking on the set of all the virtual paths remaining in the optimization procedure, the critical link is identified at each level as being that link which first violates the physical capacity constraints of a traversed physical link.

Dimensioning Using An Entropy Blocking Measure

The speed and efficiency of the above procedure for identifying the critical link at each stage of the dimensioning process is critically dependent upon the complexity of the blocking measure used in the modeling. Traditionally, the Erlang blocking measure (also known as the time congestion blocking formula) has been used to determine the optimal allocation of VP capacities in a network.

The present technique incorporating the use of the Entropy Rate Function as a blocking measure yields superior results to those obtainable by use of the Erlang blocking measure. The use of the Entropy Rate Function permits the modeling of arbitrary traffic distributions, and in most cases this computation can be done much faster compared to computations based upon other blocking measures. It has also been found that the iterative search for the critical link can be substantially improved, a result principally following from the fact that the Entropy Rate Function is a convex function. Prior to a description of a dimensioning algorithm using the Entropy Rate Function, it would be useful to explore the characteristics of the Entropy Rate Function.

The Entropy Rate Function As A Blocking Measure

As noted earlier, the choice of the blocking measure is critical to the Push Down algorithm. A general expression for the blocking measure based on the Entropy Rate Function will be derived next and applied to an exemplary situation where the offered traffic is alternately modeled by single-class and by multi-class Poissonian distributions.

The Entropy Rate Function is known in the art, and has been used to model congestion at the physical link level, see, e.g., J. Y. Hui, *A Congestion Measure for Call Admission and Bandwidth Assignment for Multi-Layer Traffic*, International Journal of Digital & Analog Cabled Systems (1990), but has not hitherto been used as a blocking measure in solving either the dimensioning or the planning problem at either the virtual path level or at the network level. Additionally, the Entropy Rate Function has been used to define the concept of "effective capacity" of a physical link. It is important to note that the dimensioning technique using the Entropy Rate Function detailed herein is not limited to offered traffic that follows a Poisson distribution and that the system and method works equally well with any type of offered traffic distribution, including that determined by measurements.

Saturation blocking probability can be defined as the probability that the traffic demand exceeds a specified value of transmission capacity. The saturation probability is also called the "tail probability", because it denotes the probability mass of the tail of the offered traffic distribution. A well known approximation to this tail probability, namely *Chernoff's Bound*, is derived below.

Let X be an arbitrary distributed random variable, and C be a given value. Then for all positive values of s, the following bound can be shown to exist:

$$P(X>C) = P(e^{sX} \geq e^{sC}) \leq \frac{E(e^{sX})}{e^{sC}} = e^{-(sC-\ln(E(e^{sX})))} \quad \text{(EQN. 7)}$$

where P(X>C) is the probability that the random variable X takes values greater than C.

The derivation of this bound is based on the Markov inequality. The term, $\ln(E(e^{sx}))$, denotes the log moment generating function, and is also called the cumulant function, $\mu(s)$. The tightest bound (also known as *Chernoff's Bound*) is obtained by maximizing the exponent $sC-\mu(s)$ with respect to s. This maximum is reached at s=s* where s* is the unique positive solution for the equation, $C=\mu'(s)$.

It is easy to show that $\mu'(s)$ increases with s, thereby guaranteeing the uniqueness of its root. $\mu'(s)$ increases with s because $\mu''(s) \geq 0$. This in turn is due to the fact that the second derivative is equal to the variance of the (shifted) distribution. This maximizing exponent is denoted by $I_x(C)$ and is called the Entropy Rate Function. The Entropy Rate Function is the convex conjugate transform of the cumulant function and can be stated by the following expression:

$$-\ln P(X \geq C) \geq \sup_s (sC - \ln E(e^{sX})) = I_x(C) \quad \text{(EQN. 8)}$$

Since $\ln P(X \leq C) = \ln P(-X \geq -C)$, and $\ln P(-X \geq -C) = \ln p(e^{-sX} \geq e^{-sC})$, a similar expression for the left tail of the distribution can be derived by the following inequality:

$$-\ln P(X \leq C) \geq \sup_s P(-sC - \ln E(e^{-sX})) = I_{-x}(-C) \quad \text{(EQN. 9)}$$

The relation between the right and the left tails of the Entropy Rate Function distribution can be expressed using the parameter, s as:

$$I_{-x}(-C(s)) = I_X(C(-s)) \quad \text{(EQN. 10)}$$

Thus, by changing the sign of the parameter, s, one can switch from the right tail to the left tail of the Entropy Rate Function distribution and vice versa.

The Entropy Rate Function For Homogenous Poissonian Traffic

The use of the Entropy Rate Function to dimension virtual paths when the offered traffic is homogenous is considered first. Homogenous Poisson traffic can be characterized by a bandwidth demand parameter, p, the mean call arrival rate, r, and the mean duration of each call, h, (also referred to as the mean holding time). The traffic demand, ρ, is therefore the product of the mean call arrival rate and the mean holding time, i.e., r*h. The cumulant function for homogenous traffic is described by the relationship:

$$\mu(s) = \rho(e^{sp} - 1) \quad \text{(EQN. 11)}$$

Consequently, the allocated capacity, C, and the Entropy Rate Function, I, for homogenous traffic are given by:

$$C = \mu'(s) = \rho p e \quad \text{(EQN. 12)}$$

and $I(C) = s^*(C) \cdot C - \mu(s^*(C)) \quad \text{(EQN. 13)}$ i.e. $I(C(s)) = s \rho p e^{sp} - \rho(e^{sp} - 1) \quad \text{(EQN. 14)}$ By substituting the relation $s = 1/p (\ln C - \ln(\rho p))$ as the solution to Equation (EQN. 12), the Entropy Rate Function for the homogeneous traffic of the type described by Equation (EQN. 14) can also be expressed solely as a function of the allocated capacity, C, as:

$$I(C) = \frac{C}{p} (\ln C - \ln(\rho p)) - \rho \left( \frac{C}{\rho p} - 1 \right) \quad \text{(EQN. 15)}$$

Figure 10:
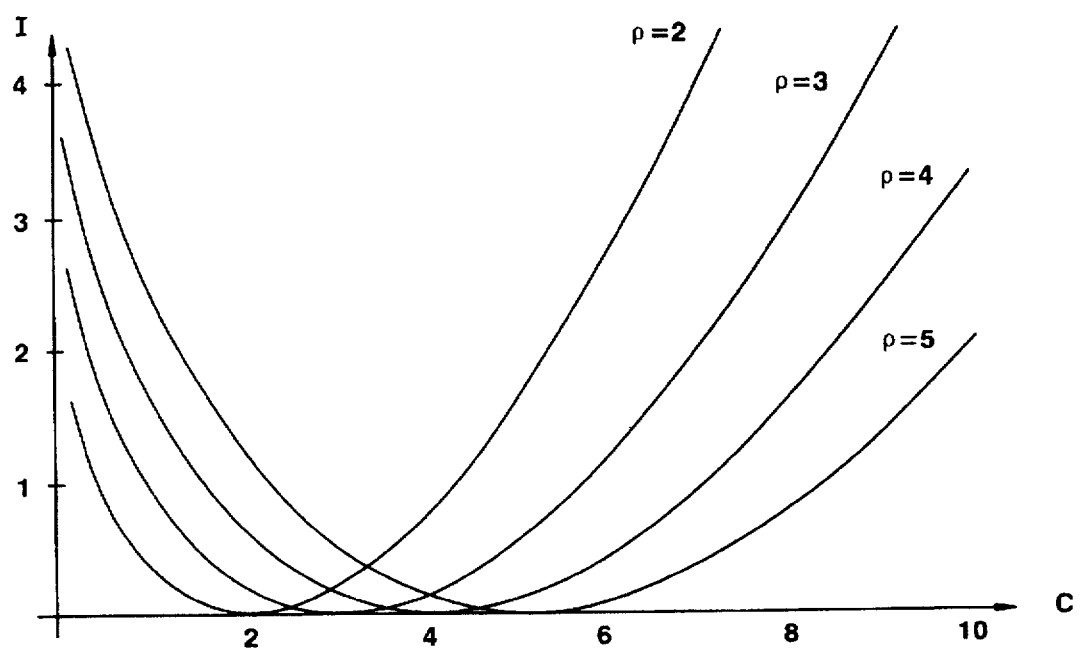
FIG. 10 is a graph illustrating the characteristics of the Entropy Rate Function related to the present invention.
Figure 11:
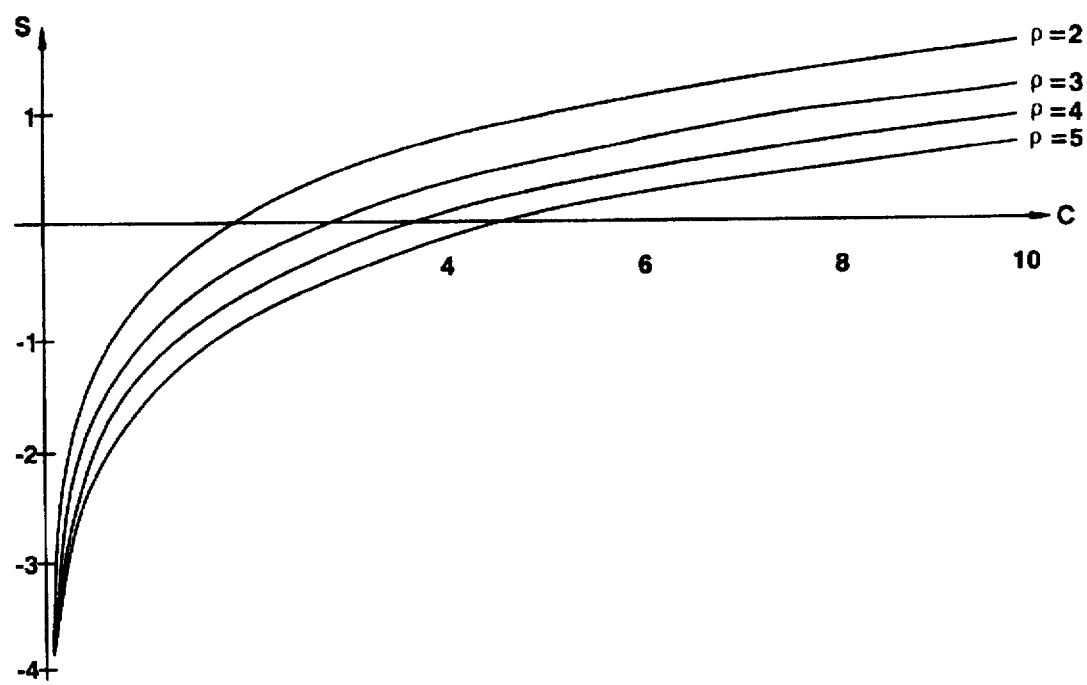
FIG. 11 is a graph illustrating the characteristics of the shift parameter that is related to the Entropy Rate Function illustrated in FIG. 10.

FIG. 10 graphs the characteristics of the Entropy Rate Function for different values of offered traffic in the unit bandwidth demand, p. FIG. 11 shows the shift parameter, s, plotted as a function of the allocated capacity, C.

As shown in FIGS. 10 and 11, the Entropy Rate Function has three significant properties. First, it is a convex function that reaches its minimum value of zero at the mean of the distribution, i.e., when C=ρ. Second, the shift parameter, s, goes from negative to positive for increasing values of C at the mean of the distribution, i.e., at C=ρ. As can be seen from FIG. 11, the shift parameter, s, is negative when C<ρ and is positive when C>ρ. Third, the shift parameter, s, is monotonic and increases as a function of the capacity allocated to a virtual path.

The transform parameter, s, can thus be interpreted as a probability distribution shift parameter. When the shift parameter takes negative values, the probability distribution is shifted to the left compared to the probability distribution corresponding to the zero value of the shift parameter. When the shift parameter takes positive values, then the probability value is shifted to the right.

The Entropy Rate Function For Multi-Class Poissonian Traffic

The traffic model can be extended to offered traffic characterized by a multi-class Poisson distribution and the Entropy Rate Function corresponding to such an offered traffic model is derived next.

Replacing the entropy measure for the single-class distribution with the entropy measure for the multi-class distribution induces the difficulty that the Entropy Rate Function can no longer be explicitly expressed in terms of the allocated capacity, C. To avoid this problem, the Entropy Rate Function is expressed in terms of the shift parameter s which is also utilized as a control parameter. By increasing the absolute value of this parameter, allocated capacities can be varied implicitly, thus permitting the entropy measure to be positively incremented.

Let us denote the random traffic of class i (where i takes values from 1 to k) by $X_i$. The peak bandwidth demand $p_i$, the mean call arrival rate $r_i$ and the holding time $h_i$ of each class are defined such that $\rho_i = r_i h_i$ and the expectation value of the cumulative value of the random variable $X_i$ is:

$$E\left( \sum_{i=1}^{k} X_i \right) = \sum_{i=1}^{k} \rho_i p_i \quad \text{(EQN. 16)}$$

The Entropy Rate Function $$I_{\sum_{i=1}^{k} X_i}(C)$$

for multi-class traffic $$\sum_{i=1}^{k} X_i$$

is an estimate of the negative logarithm of the saturation probability:

$$-\ln \left( \sum_{i=1}^{k} X_i \geq C \right) > I_{\sum_{i=1}^{k} X_i}(C) \quad \text{(EQN. 17)}$$

where k is the number of traffic classes and C is the capacity allocated to the VP carrying this aggregated multi-class traffic.

The following relation expresses a general property of the Entropy Rate Function that is valid for all distributions:

$$I_{\sum_{i=1}^{k} X_i}\left( E\left( \sum_{i=1}^{k} X_i \right) \right) = I_{\sum_{i=1}^{k} X_i}\left( \sum_{i=1}^{k} \rho_i p_i \right) = 0 \quad \text{(EQN. 18)}$$

It can likewise be shown that $$I_{\sum_{i=1}^{k} X_i}(C)$$

is convex in C.

The log moment generating function for multi-class Poisson traffic is given by the relation:

$$\mu(s) = \sum_{i=1}^{k} \rho_i(e^{sp_i} - 1) \quad \text{(EQN. 19)}$$

Since the Entropy Rate Function has the general form:

$$I_X(C(s)) = \sup_s (sC - \mu_x(s)) = s\frac{d}{ds}\mu_x(s) - \mu_x(s) \quad \text{(EQN. 20)}$$

the Entropy Rate Function for multi-class traffic can be expressed in terms of the shift parameter, s, as:

$$I_{\sum_{i=1}^{k} X_i}(C(s)) = \sum_{i=1}^{k}(s\rho_i p_i e^{sp_i} - \rho_i(e^{sp_i}-1)) \quad \text{(EQN. 21)}$$

where the allocated capacity, C, can further be functionally related to the shift parameter, s, as:

$$C(s) = \frac{d}{ds}\mu(s) = \sum_{i=1}^{k}(\rho_i p_i e^{sp_i}) \quad \text{(EQN. 22)}$$

The replacement of the single-class entropy measure with the multi-class entropy measure makes the problem analytically more complicated because the entropy measure can no longer be expressed explicitly in terms of the allocated capacity, C. This complication is due to the fact that the shift parameter, s, cannot be eliminated from Equation (EQN. 22).

However, since Equation (EQN. 21) expresses the Entropy Rate Function in terms of the shift parameter, s, we can vary s instead of varying C. Thus the capacity value can be computed at each iterative step of the algorithm by using Equation (EQN. 22). It should be noted that the zero value of s corresponds to the zero value of the entropy measure. The dimensioning algorithm is initialized by setting s to zero for all VPs.

The Entropy Rate Function For Normally Distributed Traffic

The Entropy Rate Function can also be used with other traffic models than those based on Poissonian offered traffic distributions. Two other important traffic models are discussed below. The first traffic model is based on the Entropy Rate Function for a normal distribution of offered traffic. Corresponding expressions for the Entropy Rate Function are derived for this traffic model. The second traffic model is based on the Entropy Rate Function derived from actual traffic flow measurements rather than on explicit assumptions about the distribution of the offered traffic.

The Entropy Rate Function for normally distributed traffic has been shown, see R. S. Ellis, *Entropy, Large Deviations and Statistical Mechanics* 39 (Springer-Verlag, 1985), to be defined by the following expression:

$$I_X(C) = \frac{(C-m)^2}{2\sigma^2} \quad \text{(EQN. 23)}$$

where m is the mean and ρ is the variance of the normal distribution N(m, σ). Further, $$s(C) = \frac{C-m}{\sigma^2} \quad \text{(EQN. 24)}$$

These two relations yield the following simple expression for the Entropy Rate Function directly in terms of the control parameter, s:

$$I_X(C(s)) = \frac{\sigma^2}{2} s^2 \quad \text{(EQN. 25)}$$

Thus in the case of normally distributed traffic, the Entropy Rate Function is shown to be a simple (and convex) quadratic function.

The Entropy Rate Function For Measured Traffic

Since the diversity of services that will be provided in the networks of the future will be considerably greater than those available today, it is very likely that future broadband networks will experience huge variations in the types of traffic offered to the network. Consequently, all models that are based upon assumptions about specific idealized representations of the traffic distribution are likely to be inadequate because of their inherent inflexibility. Using an Entropy Rate Function derived from traffic measurements may provide one solution to this difficult traffic model estimation problem.

The traffic models that were discussed up to now had been defined on the call-level time scale. In contrast, traffic measurement statistics are defined on the time scale of a standard ATM cell. The call-level time scale can be considered to be an approximation of the cell-level time scale. Randomly changing traffic demand during a call can thus be abstracted by one or more parameters describing constant bandwidth demand on the call-level time scale.

It has recently been suggested that the Entropy Rate Function can be estimated from traffic measurements on the cell level. See, e.g., N. G. Duffield et al., *Entropy of ATM Traffic Streams: A Tool for Estimating QoS Parameters* (Dublin Institute for Advanced Studies, 1994).

Effect of Traffic Overload on the Entropy Rate Function

The interpretation of the Entropy Rate Function as a blocking measure, works well if the average offered traffic on each physical link is lower than the corresponding available physical capacity on that link, i.e., if $E(X_k) \leq \overline{C}_{phys}^k$. However, this condition may be violated in some realistic overload situations. Consider the following example based on homogeneous Poisson traffic and time-congestion blocking measure (i.e., the Erlang blocking formula).

TABLE 2 lists three values of allocated capacities and corresponding traffic demands that were calculated for a fixed blocking value of 0.03. Note that in the last case, the offered traffic is larger than the allocated capacity, even though the blocking is relatively low.

TABLE 2

| ALLOCATED CAPACITY | AVERAGE OFFERED TRAFFIC |
|---|---|
| 15.45 | 10 |
| 109.29 | 100 |
| 699.00 | 700 |

This example shows that the entropy blocking measure needs to be extended to cover the overload situation when the condition $E(X_k) \leq \overline{C}_{phys}$ is violated. Mathematically, such an extension can be accomplished easily. As shown previously, the Entropy Rate Function is a convex function having a minimum value of zero at $E(X_k)$. The left branch of the Entropy Rate Function defines the overload region (see FIGS. 10 and 11). In this region, an increase in the Entropy Rate Function corresponds to a decrease in the allocated capacity and to negative values of the control parameters. By changing the sign of the control parameter, Push Down algorithm based on the Entropy Rate Function can be easily extended to cover the overload region. Such an extension requires only a minor modification of the original dimensioning algorithm.

The problem that remains is largely conceptual in nature, namely how to interpret this extension. The left branch region of the Entropy Rate Function corresponds to the approximation of the left tail of the probability mass:

$$-\ln P(X \leq C) \geq I_X(C(-s)) \quad \text{(EQN. 26)}$$

and can be interpreted as an entropy measure of the utilization of the allocated capacity, C.

Since in the initial state, the resources that were allocated exceeded the capacities of the physical resources, i.e., $E(X_k) \geq C_{phys}^k$, consequently, the utilization has to be decreased as it corresponds to an increase in the Entropy Rate Function.

One interpretation of the objectives of the optimization in the overload region can be as follows. To improve the uniformity of the distribution of entropy utilization measures in this region, the largest consumer of resources (i.e., the VP having the lowest entropy) is identified and the utilization of this extreme representative is decreased. Decreasing utilization of the largest consumer corresponds to an increased Entropy Rate Function in the overload region. Thus, this approach corresponds to a maxi min formulation of the optimization problem. It should be noted that the constraint conditions are now applied by starting with values that initially fall in the overload region.

Here again, we can use the correspondence of the uniform distribution of the entropy utilization measures to the best utilization of resources can be used (even if the best utilization is infeasible). Following the same reasoning as for the right branch region, to satisfy the constraint conditions, the entropy utilization measure is made uniform on each critical link. Further, the capacities of all VPs traversing the critical link are allocated in such a way that the entropy utilization values of these VPs are made equal.

As discussed earlier, the objective of the optimization in the right side region of the entropy curve was to increase the capacity allocated to the VP having the highest blocking (i.e., the VP with the least entropy blocking measure). This corresponds to a maxi min formulation of the optimization problem. It should be noted that the optimization objective for the left side region can be transformed to an optimization problem for the right side region by replacing the term "utilization" by the term "blocking" and the term "largest consumer of resources" by the term "VP with the largest blocking" in the earlier formulated optimization objective for the left side region.

These two different formulations of the optimization objective for the left and the right branch of the Entropy Rate Function result in the same optimization procedure. In both cases the Entropy Rate Function needs to be increased. This can be accomplished by increasing the absolute value of the control parameter, s. If the load does not exceed the resources available, then the shift parameter will be positive and the capacities allocated to the various virtual paths can be successively raised until all the available physical resources are allocated. If, on the other hand, the load exceeds the resources available, then the shift parameter is negative. In such cases, the allocated capacities need to be gradually decreased until they come within the physical resource constraints.

VP Dimensioning Algorithm Using the Entropy Rate Function

Figure 12A:
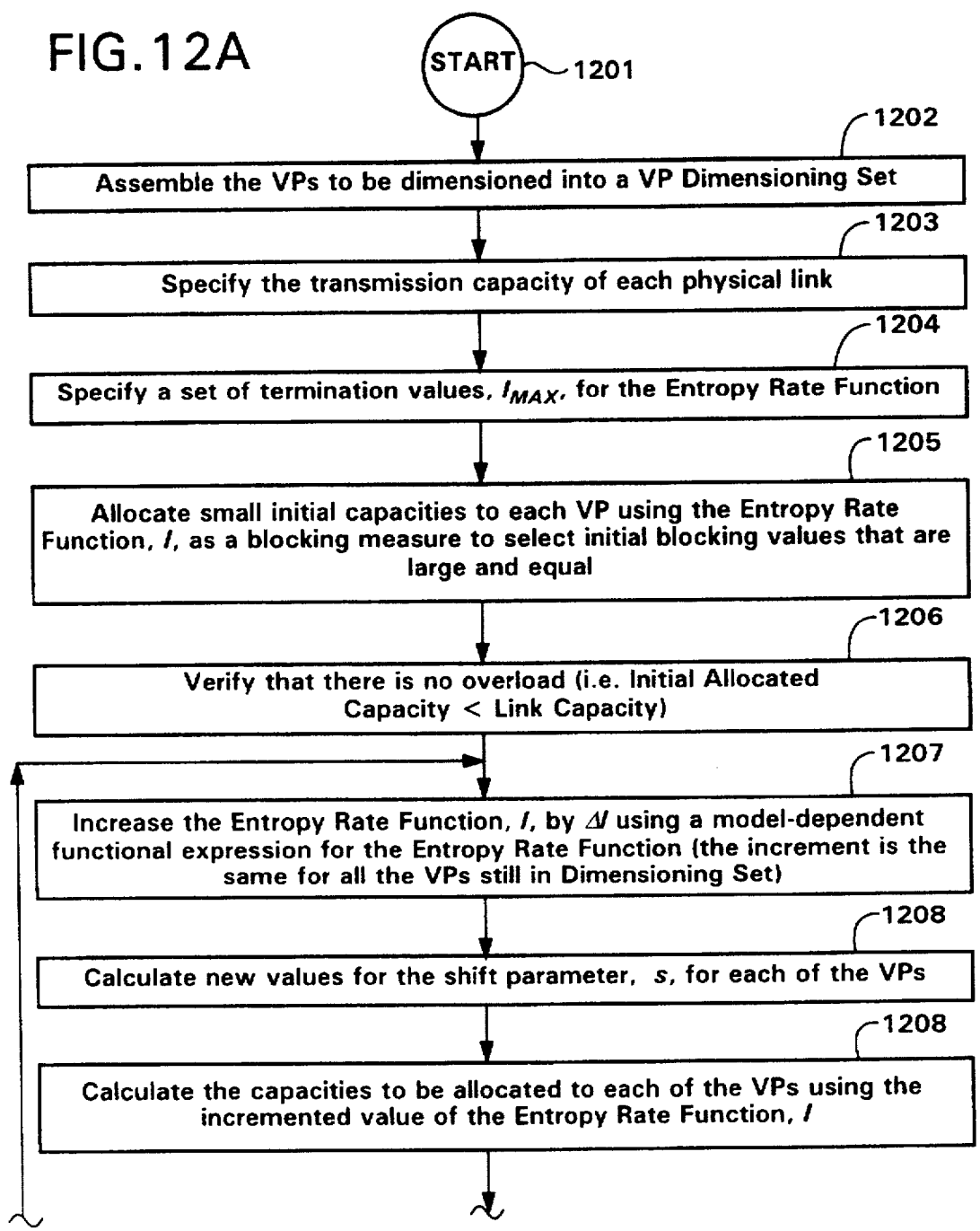
FIG. 12 is a flow chart depicting the various steps of a Virtual Path dimensioning algorithm using the Entropy Rate Function that is related to the present invention.

We can apply the above-detailed characteristics of the Entropy Rate Function to solve the VP dimensioning problem efficiently. As explained earlier, the VP dimensioning problem aims at allocating limited physical network resources amongst a plurality of predefined VPs given an offered traffic distribution. One embodiment of a VP dimensioning algorithm that uses the Entropy Rate Function as a blocking measure is shown in FIG. 12.

The process starts with a series of initialization steps 1202 to 1206. All of the VPs that are to be dimensioned are assembled into a VP dimensioning set at 1202. The transmission capacity constraints for each physical link in the network are specified at 1203. A set of upper limits, for the Entropy Rate Function, $I_{MAX}$, are optionally specified, one per virtual path, at 1204.

It should be noted that steps 1202 to 1204 may be performed in any order depending on implementation considerations. Further, $I_{MAX}$ is specified at 1204 only if there is a realistic likelihood of the offered traffic distribution having a truncated right tail i.e., only if $P(X \geq C)$ is zero for values of X that are greater than some finite value, $C_{MAX}$. If an offered traffic distribution has a truncated right tail, then it is theoretically possible to size network resources to achieve zero blocking. However, such situations are rare in practice.

Other initialization steps include the selection of large and equal blocking values for each of the Virtual Paths at 1205. As explained elsewhere, there is an inverse relationship between the values of the Entropy Rate Function and the corresponding blocking on a VP. Consequently, large blocking values correspond to small values of the Entropy Rate Function. Using the relations developed earlier, initial capacity allocations for the various VPs are also computed at 1205.

At 1206, these initial capacity allocations are cumulated over each physical link and compared to the prespecified transmission capacity of that physical link. If the initial allocations are such that there is overload on one or more of the physical links, then the computational steps that follow are modified to use formulae based on negative values of the shift parameter, s. This result follows from the fact that the algorithm for the overload situation corresponds to a reflection of the dimensioning problem to negative values of the shift parameter, s.

Another step implicit in the initialization process is to choose an offered traffic model, and if this model is not based on measurements, to derive the corresponding relations for the Entropy Rate Function, I, the allocated capacity, C, and the shift parameter, s. This step is not shown in FIG. 12.

After the initialization steps 1202 to 1206, the dimensioning technique performs recursive steps 1207 to 1215. The recursive technique outlined in FIG. 12 shows a two-level recursion wherein the VP dimensioning algorithm first iteratively allocates capacity to the VPs in the VP dimensioning set, as shown in 1207 to 1210, till one or more physical links reach full (i.e., 100%) utilization.

Physical links whose capacities are fully allocated are called critical links. Thus the net effect of steps 1207 to 1210 is to recursively identify critical links. While the critical link identification procedure is likely to identify only one physical link as a critical link at each stage of the iterative procedure, the algorithm, as implemented, is equally capable of identifying and processing more than one critical link at a given time.

In one embodiment of the present invention, the identification of critical links is done by incrementing, at 1207, the current Entropy Rate Function estimate by a fixed amount using a functional expression for the Entropy Rate Function that depends on the offered traffic model. Examples of such expressions can be found in Equation (EQN. 15) for homogenous Poissonian traffic, Equation (EQN. 21) for multi-class Poissonian traffic and Equations (EQN. 23 & EQN. 25) for normally-distributed traffic. It should be noted that an increment to the Entropy Rate Function Estimate may, occasionally be negative. This can happen if the dimensioning algorithm overshoots the optimal value and over allocates capacities.

The values of the shift parameter, s, are calculated at 1208 for each of the VPs in the dimensioning set. It should be noted that the shift parameter value represents the slope of the entropy-capacity graph of FIG. 10, for the corresponding VP. The incremental capacities to be allocated to the VPs in the dimensioning set is calculated at 1209 using the incremented values of the Entropy Rate Function. Steps 1207 to 1209 may be performed in a different sequence than that shown in the FIG. 12 based upon implementation considerations.

The capacities allocated to various VPs are then cumulated at 1210 for each of the physical links and compared in 1211 against the total capacity of that physical link. If the unallocated physical capacity of a link falls below a preset limit, then the link is determined to be a critical link.

If the comparison results in the identification of a physical link as a critical link, then the computation proceeds to 1212. If no physical link is found to be a critical link, then steps 1207 to 1210 or their equivalents are iteratively repeated until a critical link is found. In rare situations involving offered traffic models having a truncated right tail, it is possible that the iterative procedure is sometimes unable to identify any more critical links. In such situations, the calculation automatically terminates when the Entropy Rate Function reaches its maximum value, $I_{MAX}$, as specified at 1204.

After identifying a critical link, the VP dimensioning algorithm outputs the results and reformulates the problem as shown at 1212 to 1213. Every time one or more physical links are identified at 1211 to be critical links, the VP dimensioning algorithm proceeds to generate output, at 1212, detailing the currently allocated capacities on each of the VPs traversing a critical link. VPs traversing a critical link are removed from the dimensioning set at 1213. If no VPs remain to be dimensioned, then the dimensioning algorithm terminates at 1216.

If one or more VPs remain to be dimensioned, then the dimensioning set is redefined at 1215 to include only such VPs. Since the VPs traversing critical links were removed from the dimensioning set, and since these removed VPs used up part of the physical link capacities, the dimensioning task reduces to the distribution of the unallocated physical link capacities over the VPs still remaining in the dimensioning set. This is done at 1215 by reducing the available capacities of the various physical links by the amounts allocated to removed VPs that correspond to the critical links last found at 1211. In an alternative embodiment of the invention, the same effect is achieved by freezing the values of the Entropy Rate Function for VPs that have been eliminated from the VP dimensioning set. Since the capacities allocated to removed VPs were generated at 1212, this computation can be easily performed. After the reformulation of the problem at 1215, the algorithm loops back to 1207, and as before, the Entropy Rate Function is incremented by a fixed amount for all the VPs still remaining in the dimensioning set.

VP Dimensioning Using An Adaptive Search Technique

A method of improving the computational efficiency of the basic VP dimensioning algorithm over and above that obtainable by the use of the Entropy Rate Function as a blocking measure is presented below. This method is based on the general properties of the Entropy Rate Function and can be applied to any kind of traffic distribution model, including one based on actual traffic measurements.

The convergence of the basic VP dimensioning algorithm can be considerably speeded up by using an iterative linear approximation similar to the Newton-Raphson technique and taking advantage of the convexity of the Entropy Rate Function. When the demand perturbations on a virtual network are small, the adaptive VP dimensioning algorithm may be further refined using a linear approximation.

Virtual networks may occasionally be subject to perturbations. These perturbations can be caused by changes in the spatial traffic pattern, changes in traffic distribution, or by small changes in network operating parameters. Such changes may occur, for example, when multiple virtual networks are first defined on top of a single physical network and subsequently small amounts of physical resources are re-allocated between the differing virtual networks.

The "movable boundary" problem is a special case of the network dimensioning problem that is discussed in greater detail and is the subject of co-pending Nonprovisional U.S. patent application Ser. No. 08/514,235, filed on even date herewith, in the name of at least one of the present inventors, and entitled "System and Method for Optimal Logical Network Capacity Dimensioning With Broadband Traffic", and assigned to same assignee as the present Nonprovisional U.S. Patent Application.

The adaptive VP dimensioning technique builds upon the VP dimensioning techniques detailed earlier (in conjunction with the text accompanying FIGS. 9 and 12) and offers the greatest advantages over prior techniques in the final stages of dimensioning. To understand the critical elements of the adaptive technique, assume that the basic algorithm is used to obtain a near-optimal state where the capacities allocated to virtual paths are close to the limiting physical capacities of the critical link. In such cases, instead of using the iterative trial and error procedure of FIG. 12 to find the state yielding full utilization of each critical link while equalizing the load on the various VPs traversing the critical link, the basic dimensioning algorithm can be speeded up considerably by using the following general approximation:

$$\Delta I(C) \approx \Delta C \frac{dI(C)}{dC} = s\Delta C \qquad \text{(EQN. 27)}$$

This approximation follows from the following easily derivable general relation for the Entropy Rate Function:

$$\frac{dI(C)}{dC} = s \qquad \text{(EQN. 28)}$$

Next, we need to calculate the common increment to the Entropy Rate Function for link k at step t, $\Delta I_k^t$, so that $\Delta C_k^t$, the unallocated capacity of critical link k can be allocated amongst all VPs traversing this link. Let the incremental capacity allocated to the $i^{th}$ VP be denoted by $\Delta C_{k,i}^t$. Since $$\Delta C_{k,i} = \frac{\Delta I_k}{s_i}$$

at every iterative step t and $$\Delta C_k^t = \sum_i \Delta C_{k,i}^t = \Delta I_k^t \sum_i \left( \frac{1}{s_i} \right),$$

it follows that:

$$\Delta I_k^t = \frac{\Delta C_k^t}{\sum_i \frac{1}{s_i}} \qquad \text{(EQN. 29)}$$

The relation between each $\Delta I$ calculated from Equation (EQN. 29) and the corresponding $\Delta s$ values is:

$$\Delta I(C(S)) =$$

$$\Delta s \frac{dI(C(s))}{ds} = \Delta s \frac{dI(C)}{dC} \cdot \frac{dC(s)}{ds} = s \frac{d^2\mu(s)}{ds^2} \Delta s = sV(s)\Delta s$$

and thus, by substituting $C=\mu'(s)$ in the derivative $$\frac{dC(s)}{ds} = s$$

and by defining $$V(s) = \frac{d^2\mu(s)}{ds^2}$$

as the variance of the shifted distribution, we obtain the relation between $\Delta s$ and $\Delta I$ as:

$$\Delta s = \frac{\Delta I}{sV(s)} \qquad \text{(EQN. 30)}$$

Adaptive VP Dimensioning Algorithm

Equation (EQN. 29) can be used to estimate even large values of the Entropy Rate Function increment, $\Delta I_k^t$, as long as the instantaneous slopes of the Entropy Rate Function, $s_i^t$ are non-zero. Since the Entropy Rate Function is convex in C and C increases monotonically with s, $\Delta I_k^t$ will be underestimated by this calculation technique. Consequently, this procedure will stably converge if iterated.

Figure 13A:
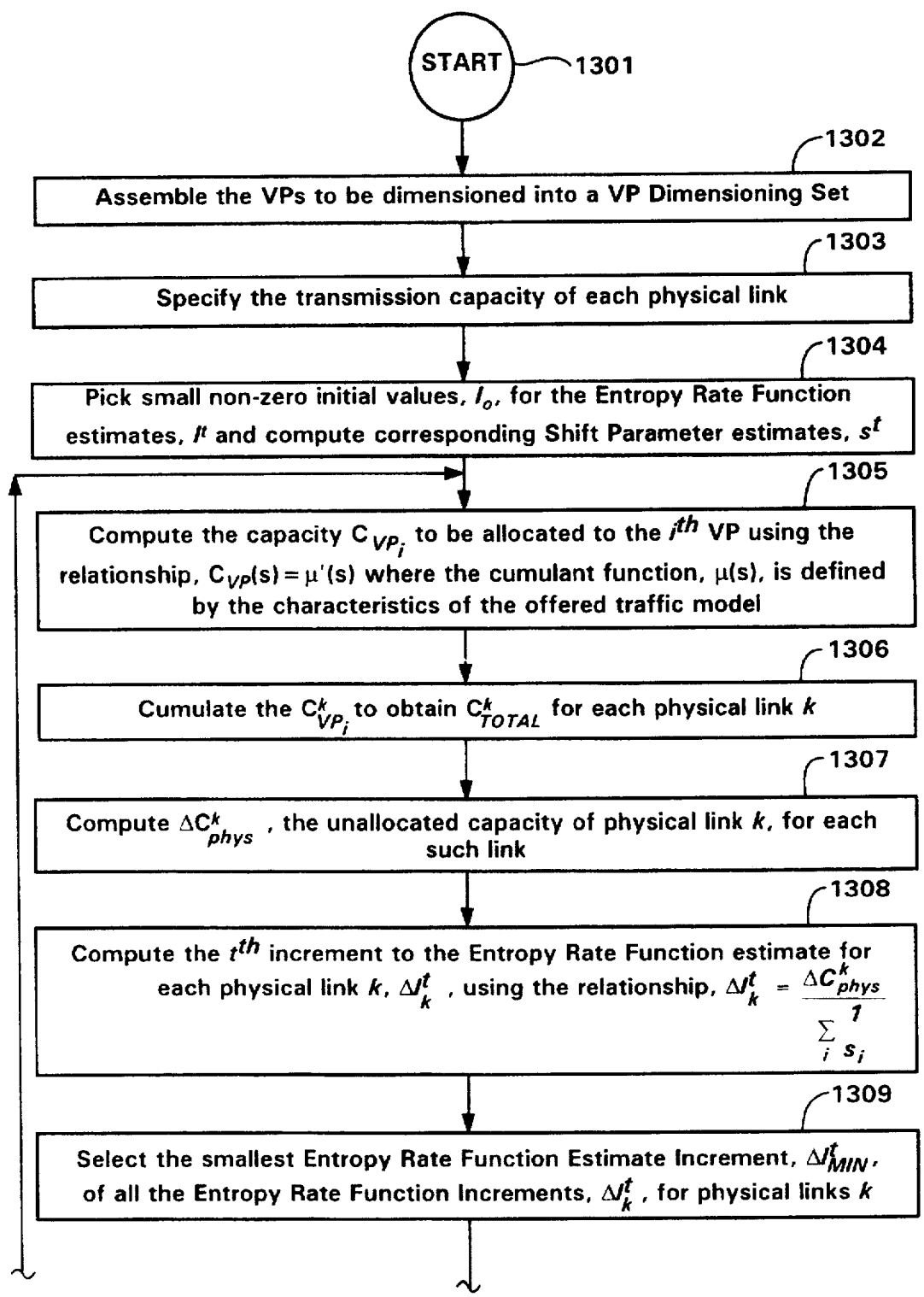
FIG. 13 is a flow chart depicting the successive steps in the adaptive dimensioning algorithm related to the present invention.
Figure 13B:
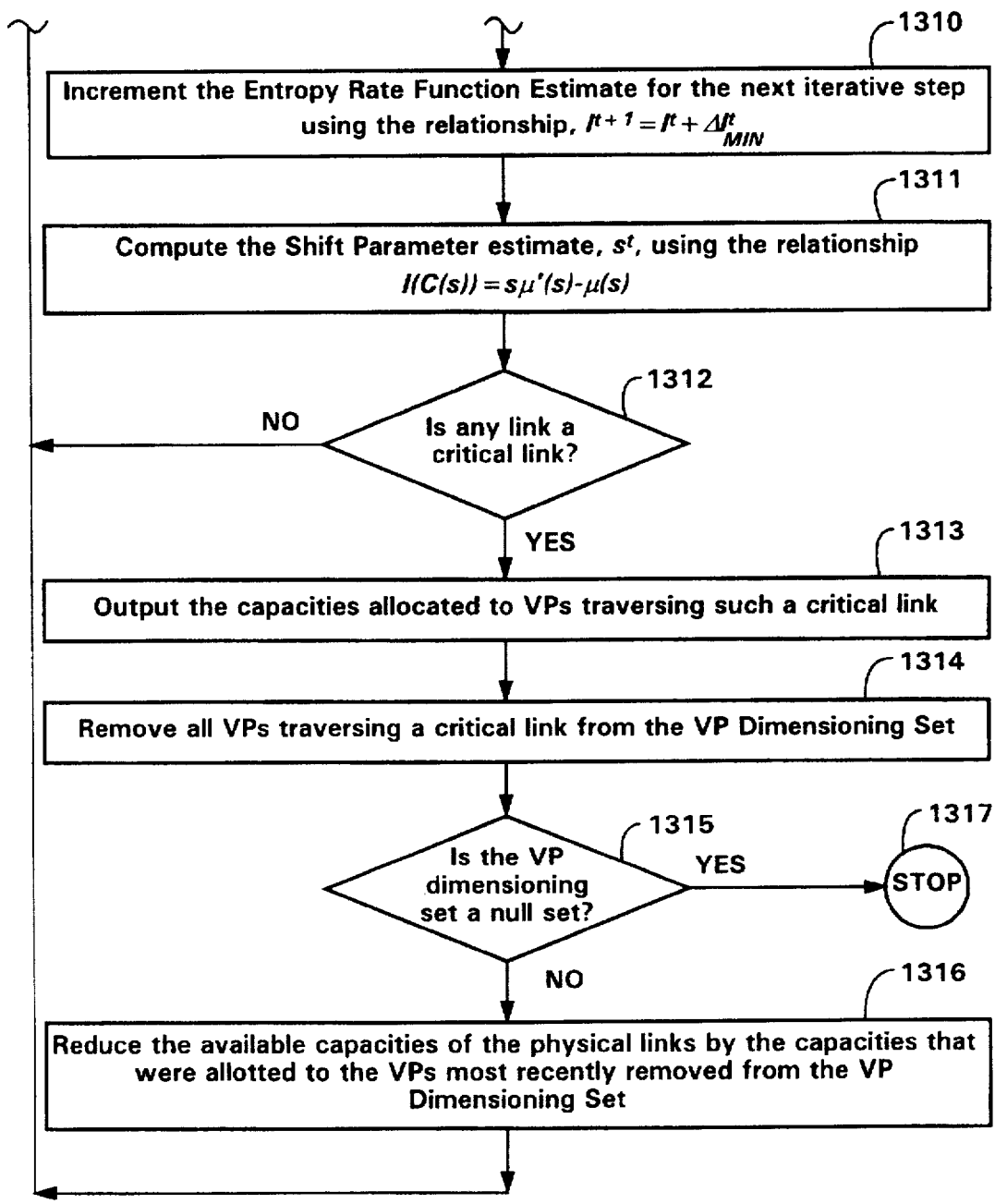

Another embodiment of a VP dimensioning algorithm that uses the Entropy Rate Function as a blocking measure is shown in FIG. 13. In contrast to the trial-and-error technique used in the basic VP dimensioning algorithm used in FIG. 12, this dimensioning technique uses an adaptive search technique that resembles, in some ways, the Newton-Raphson technique.

The adaptive VP dimensioning algorithm shown in FIG. 13 starts, as in the basic VP dimensioning algorithm of FIG. 12, with a series of initialization steps 1302 to 1304. The VPs that are to be dimensioned are assembled into a VP dimensioning set at 1302. The transmission capacity constraints for each physical link in the network are specified at 1303. An upper limit for the Entropy Rate Function, $I_{MAX}$, may also be optionally specified at this stage, as was done at 1204 in the basic entropy-based VP dimensioning algorithm of FIG. 12. As before, $I_{MAX}$ is specified only if there is a realistic likelihood of the offered traffic distribution having a truncated right tail.

It should be noted that initialization steps 1302 and 1303 may be performed in any order depending on implementation considerations. As before, the specification of $I_{MAX}$ at 1204 is done only if there is a realistic possibility that the offered traffic distribution has a truncated right tail. As in the basic entropy-based VP dimensioning algorithm, the initialization process implicitly includes choosing an offered traffic model and deriving the corresponding relations for the Entropy Rate Function, f, the allocated capacity, C, and the shift parameter, s. These are not shown in FIG. 13.

Other initialization steps include the selection, at 1304, of small and equal non-zero initial values for the set of Entropy Rate Function estimates and corresponding non-zero values of the transformed parameters, s. As explained earlier, these initial estimates correspond to large initial blocking values.

Like the basic entropy-based VP dimensioning algorithm, this VP dimensioning algorithm iteratively allocates capacity, as shown at 1305 to 1311 till one or more physical links reach full utilization. Whenever a physical link is determined, at 1312, to be a critical link, all VPs traversing this critical link are removed from the dimensioning set and the dimensioning problem is reformulated, as shown at 1313 to 1316.

The critical link identification procedure of the adaptive VP dimensioning algorithm of FIG. 13 is somewhat different as compared to the basic algorithm shown in FIG. 12. Using the relations developed earlier, capacity allocations for the various VPs, $C_{VP}^k$ are computed at 1305 for each of the physical links k. These initial capacity allocations are cumulated at 1306 over each physical link to obtain $C_{TOTAL}^k$ for each of the physical links. Each such total is compared to the transmission capacity of each physical link as specified at 1303 to determine, the unallocated capacity of each physical link, $\Delta C_{phys}^k$, at 1307.

If the initial allocations are such that there is overload on one or more of the physical links, then the computational steps that follow are modified, as in the basic model, to use formulae based on negative values of the shift parameter, s.

The increments to the Entropy Rate Function estimates for step t of the iteration, $\Delta I_k^t$, are calculated at 1308 for each of the physical links k, by using Equation (EQN. 29) and summing the inverse values of shift parameters over all VPs traversing the physical link. It should be noted that the computed value of the increment may be different for each of the physical links. The various increments to the Entropy Rate Function estimates for the various physical links are compared, at 1309, and the lowest value, $\Delta I_{MIN}^t$, is selected. The current Entropy Rate Function estimate, $I^t$, is then incremented at 1310 using the update equation:

$$I^{t+1}(s_i^{t+1}) = I^t(s_i^t) + \Delta I_{MIN}^t \qquad \text{(EQN. 31)}$$

The shift parameter estimate, s, can now be revised, at 1311, using the offered traffic model-dependent functional expression for the cumulant function, $\mu(s)$. The value of s is updated at 1311, using the relationship:

$$s_i^{t+1} = s_i^t + \Delta s_i \qquad \text{(EQN. 32)}$$

where Equation (EQN. 30) can be used to compute the changes in the transform parameter, $\Delta s_i$ whenever $s_i$ is small.

Iterative steps 1305 to 1311 are repeated until the unallocated capacity of at least one of the remaining physical links is reduced below some preset error or termination condition. When such a condition is determined at 1312, one or more physical links have been found to be critical links.

After detection of a critical link, the adaptive VP dimensioning algorithm operates identically to the basic algorithm, and the computation proceeds to 1313. If no physical link is found to be a critical link, then steps 1305 to 1311 or their equivalents are iteratively repeated until a critical link is found. In rare situations involving offered traffic models having a truncated right tail, the iterative procedure may sometimes be unable to identify any more critical links. In such situations, the calculation automatically terminates when the Entropy Rate Function reaches a preset maximum value, $I_{MAX}$.

Every time one or more physical links are identified at 1312 to be critical links, the VP dimensioning algorithm proceeds to generate output, at 1313, detailing the currently allocated capacities on each of the VPs traversing a critical link. VPs traversing a critical link are removed from the dimensioning set at 1314. If no VPs remain to be dimensioned at 1315, then the dimensioning algorithm terminates at 1317.

If one or more VPs remain to be dimensioned, then the dimensioning set is redefined at 1316 to include only such VPs. Since the VPs traversing critical links were removed from the dimensioning set, and since these removed VPs were allocated part of the physical link capacities, the dimensioning task reduces to the distribution of the unallocated physical link capacities over the VPs still remaining in the dimensioning set. This is done at 1316 by reducing the available capacities of the various physical links by the amounts allocated to removed VPs that correspond to the critical links last found at 1312. After the reformulation of the problem at 1316, the adaptive VP dimensioning algorithm loops back to 1305, and as before, capacity allocations are made to all the VPs still remaining in the dimensioning set.

Figure 14:
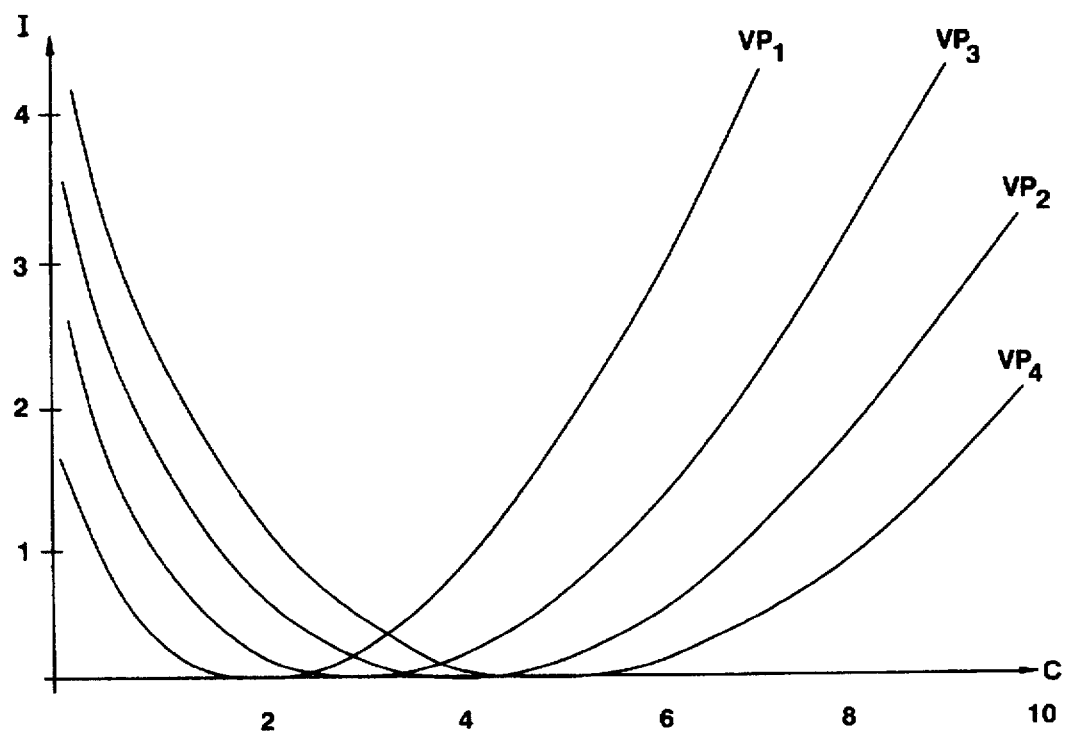
FIG. 14 is an exemplary illustration of the Entropy Rate Function for differing virtual paths.
Figure 15:
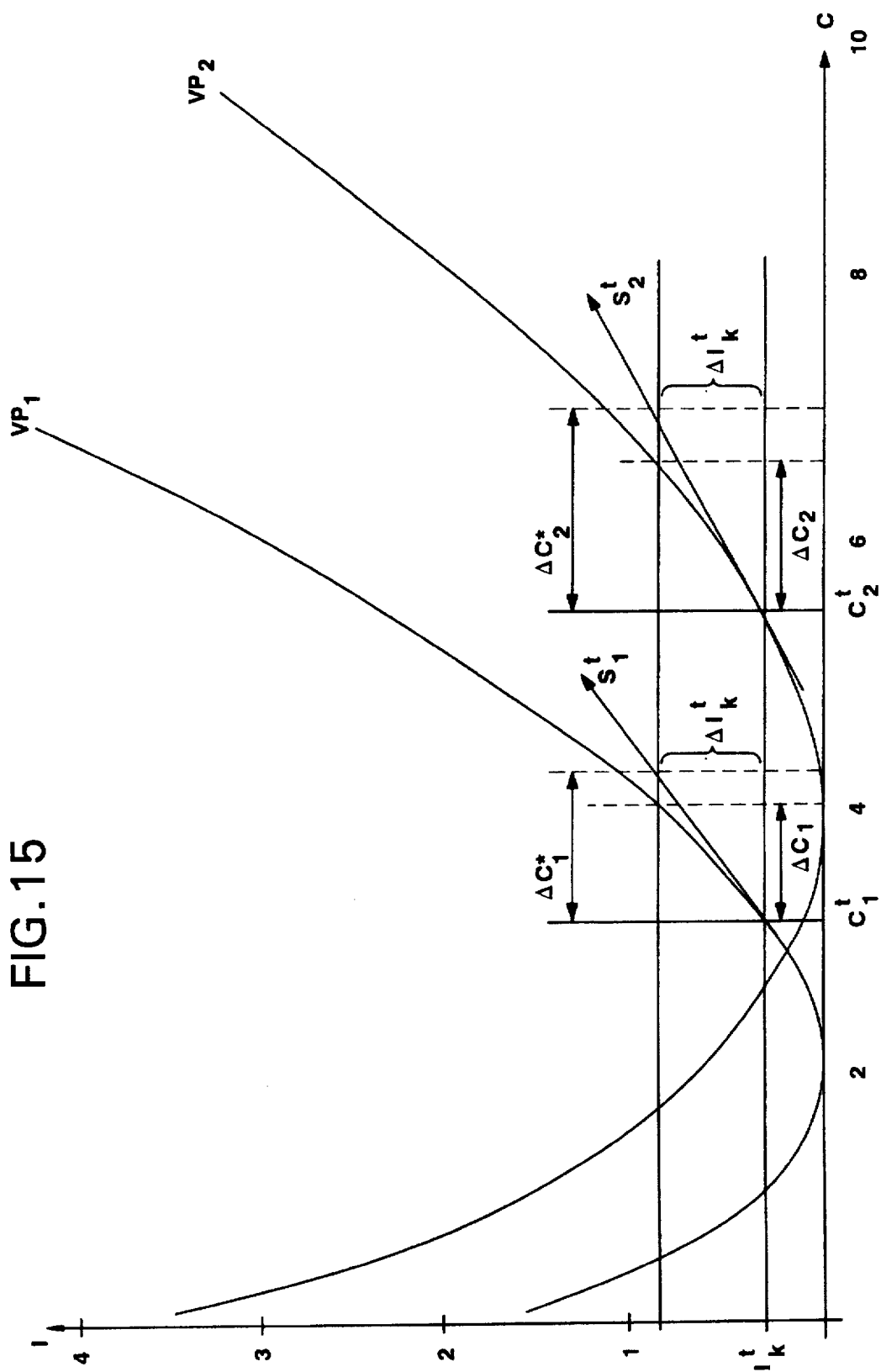
FIG. 15 is a diagram illustrating the computational steps of the adaptive dimensioning algorithm related to the present invention.

An intuitive understanding of the operation of the adaptive VP dimensioning algorithm may be obtained by reference to FIGS. 14 and 15. FIG. 14 illustrates the fact that different VPs may be characterized by different entropy-capacity curves, even if the VPs traverse a common physical link. As can be seen from FIG. 14, the entropy-capacity curves for different VPs have their minima at different values of allocated capacity. This result follows from the fact that the offered traffic on the different VPs shown are not the same. Consequently, each of the VPs have their minimum entropy point at different values of allocated capacities.

The capacity allocation procedure of the adaptive VP dimensioning algorithm is illustrated in FIG. 15 for a situation involving two virtual paths, $VP_1$ and $VP_2$ that traverse the same physical link. The procedure starts with the selection of a set of small non-zero initial values of the Entropy Rate Function, $I_k^t$. The corresponding capacities already allocated to $VP_1$ and $VP_2$ are $C_1^t$ and $C_2^t$ respectively. Tangents are then drawn on the entropy-capacity curves for $VP_1$ and $VP_2$ at the coordinates, $(C_1^t, I_k^t)$ and $(C^{2t}, I_k^t)$ respectively. These tangent lines are indicated by the reference characters $s_1^t$ and $s_2^t$ in FIG. 15 and correspond to the current iterative estimates for the shift parameters of these virtual paths.

The unallocated capacity at the start of the $t^{th}$ iteration, $\Delta C_k^t$ is equal to the difference between the total capacity, $\overline{C}_{phys}^k$, and the sum of the capacities already allocated, $C_1^t$ and $C_2^t$. Further, as the slopes $s_1^t$ and $s^{2t}$ are known, the increment to the Entropy Rate Function estimate, $\Delta I_k^t$, can be computed using Equation (EQN. 29) as:

$$\Delta I_k^t = \frac{\overline{C}_{phys}^k - (C_1^t + C_2^t)}{\frac{1}{s_1^t} + \frac{1}{s_2^t}} \quad \text{(EQN. 32A)}$$

When $\Delta C_i$ is small, $\Delta C_i^t (= C_i^{t+1} - C_i^t)$ can be calculated directly from $\Delta I_k^t$ and $\Delta s_i^t$ using Equation (EQN 27). In other situations, a model-dependent functional expression is used to calculate the link-dependent increment to the Entropy Rate Function estimates, $\Delta I_k^t$.

The minimum of the increments $\Delta I_k^t$ over the K physical links, $\Delta I_{MIN}^t$, is then identified and used to increment the Entropy Rate Function estimate. Needless to say, the Entropy Rate Function is incremented by the same amount for all physical links. The corresponding incremental capacity allocations for $VP_1$ and $VP_2$ are $\Delta C_1^t$ and $\Delta C_2^t$.

The Entropy Rate Function estimate, $I_k^t$, is then incremented by this value of $\Delta I_{MIN}^t$ to yield $I_k^{t+1}$. It should be noted that we do not calculate a different $I_k^{t+1}$ for each of the physical links, but instead use $\Delta I_{MIN}^t$ as the common increment to the prior estimate of the Entropy Rate Function. The inverse relation for the Entropy Rate Function is used to determine the capacities, $C_1^{t+1}$ and $C_2^{t+1}$, to be allocated to virtual paths $VP_1$ and $VP_2$ and simultaneously to determine the new slopes, $s_1^{t+1}$ and $s_2^{t+1}$. This iterative procedure is then repeated to obtain the next increment, $\Delta I_k^{t+1}$, to the Entropy Rate Function estimate.

The computation procedure is stable because $\Delta I^{kt}$ is underestimated. This is because, as shown in FIG. 15, the allocated capacity increments, $\Delta C_1^t$ and $\Delta C_2^t$, are smaller than the values, a $\Delta C_1^*$ and $\Delta C_2^*$, respectively, that are used at each iterative level for calculating $\Delta I_k^t$.

Deriving Other Operating Parameters From the Entropy Rate Function

In some contexts, a network operator may wish to specify network parameters such as blocking of allocated resources in terms that are different from the entropy measure. On the call-level time scale, the most common measure for the specification of blocking performance for Poisson offered traffic is the time congestion measure based on the Erlang blocking formula.

The Erlang blocking formula, $E(\rho,C)$ characterizes blocking as a function of two parameters: the load, $\rho$, and the allocated capacity, C. Since a dimensioning technique based upon an entropy measure has been found to be much speedier than other dimensioning methods, the most efficient way to calculate the final value of the time congestion measure is to use the entropy measure to obtain the optimal values of the allocated capacities and then to calculate the Erlang blocking by using the optimal values of these capacities and the known values of the traffic load.

The same approach can also be used for other blocking measures such as the time-congestion blocking measures for multi-class (i.e., non-homogeneous Poisson traffic. If the use of other blocking measures for dimensioning purposes results in complex and inefficient dimensioning algorithms, then either of the basic VP dimensioning algorithm using the Entropy Rate Function as a blocking measure or the adaptive VP dimensioning algorithm can be used instead.

Comparative Results Using the Entropy Rate Function

Figure 16:
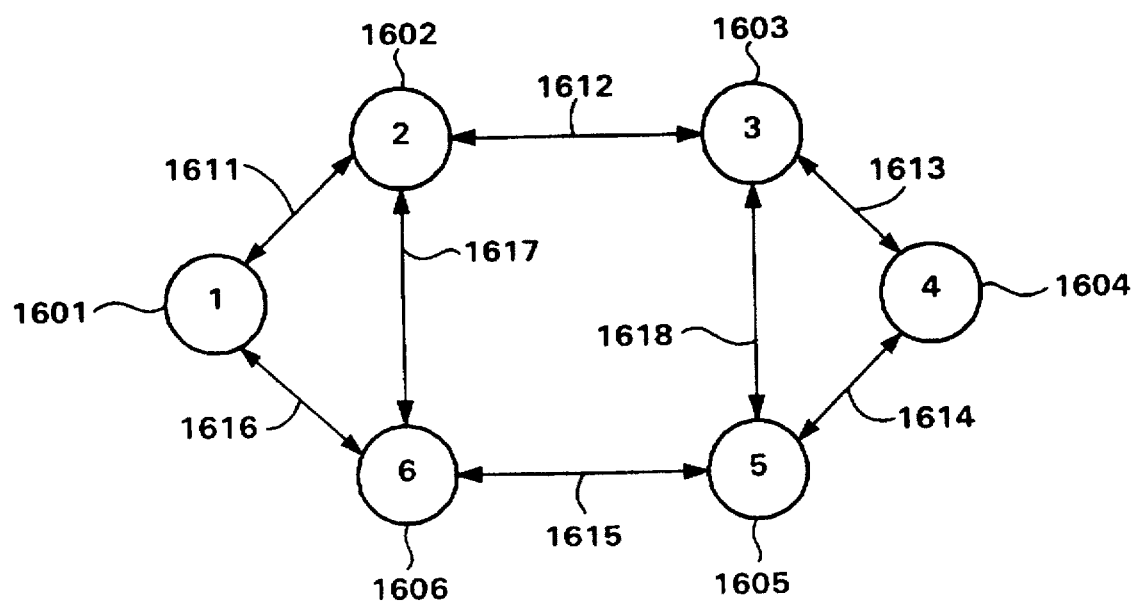
FIG. 16 is a diagram showing an exemplary physical network having six nodes.

The technique described above can be better understood by considering the following example. FIG. 16 shows an exemplary physical network having 6 nodes, labeled 1601 to 1606. As shown in FIG. 16, Node 1601 is connected to Nodes 1602 and 1606 through Links 1611 and 1616 respectively while Node 1604 is connected to Nodes 1603 and 1605 through Links 1613 and 1614 respectively. Nodes 1602 and 1605 are further connected to Nodes 1603 and 1606 through Links 1612, 1615, 1617 and 1618. The links of the physical network are assumed to be capable of carrying bi-directional traffic. However, the virtual paths defined on this physical network are assumed to be uni-directional.

Figure 17:
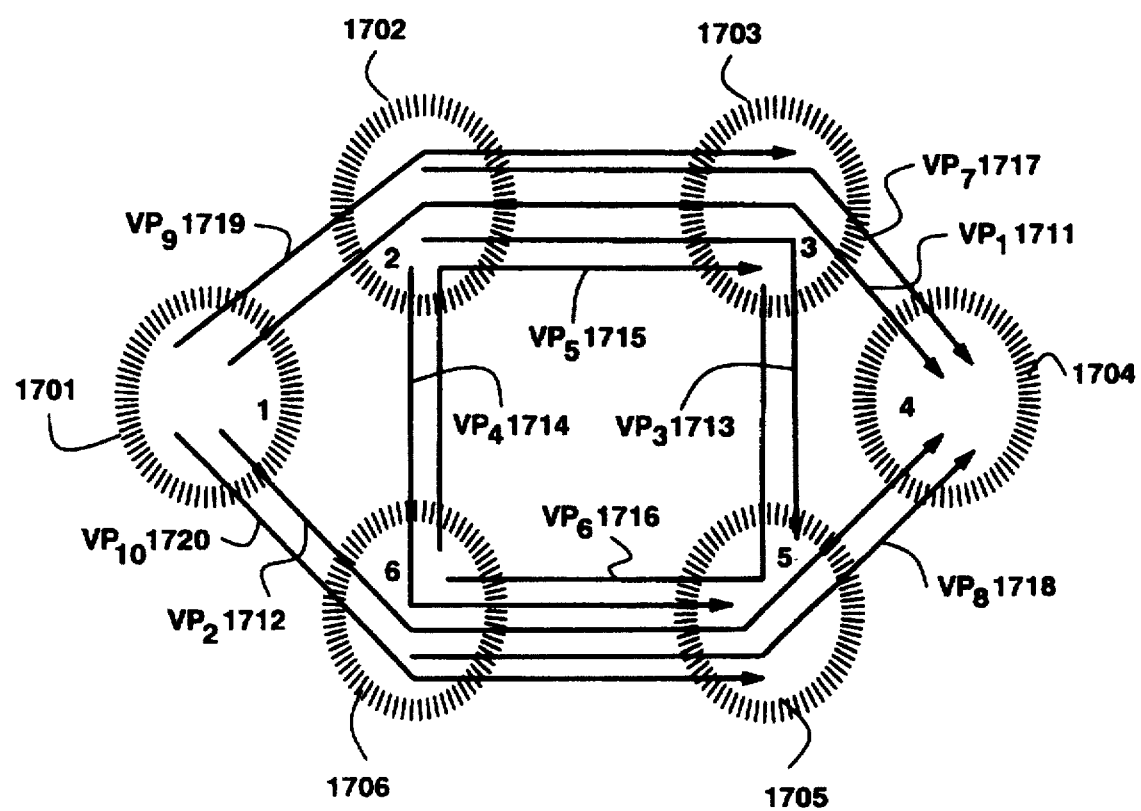
FIG. 17 is a diagram showing the connection topology of ten virtual paths defined on the six-node network of FIG. 16.

TABLE 3, set forth below, defines the routing of ten different virtual paths, $VP_1$ to $VP_{10}$, on this exemplary six-node physical network. Thus, for example, virtual path $VP_3$ runs from Node 1602 to Node 1605 via Node 1603. The connection topology of these virtual paths is illustrated in FIG. 17. Nodes 1701 to 1706 of FIG. 17 correspond to Nodes 1601 to 1606 of FIG. 16. Virtual path $VP_3$ 1713 is shown to run from Node 1702 to Node 1705 via Node 1703. In the example being considered, the transmission capacities of each of the eight physical links 1611 to 1618 of FIG. 16 are assumed to be 50 units of transmission capacity. The unit transmission capacity of each of the physical links can be selected arbitrarily, e.g., 20 megabits per second.

TABLE 3

| $VP_1$ | $VP_2$ | $VP_3$ | $VP_4$ | $VP_5$ | $VP_6$ | $VP_7$ | $VP_8$ | $VP_9$ | $VP_{10}$ |
|---|---|---|---|---|---|---|---|---|---|
| 1-2-3-4 | 1-6-5-4 | 2-3-5 | 2-6-5 | 6-2-3 | 6-5-3 | 2-3-4 | 6-5-4 | 1-2-3 | 1-6-5 |

Consider first, a situation wherein the offered traffic is homogenous. The top row of TABLE 4 shows the traffic demand for the ten virtual paths, $VP_1$ through $VP_{10}$. As can be seen, this represents a situation where the distribution of traffic demand among physical links is homogenous because the traffic demand variation between the differing virtual paths is relatively low and further, is relatively continuous, rather than bimodal or multi-modal. The dimensioning results achieved by three different algorithms are listed in TABLE 5.

TABLE 4 also shows the blocking probability using the Erlang blocking formula for the three algorithms as calculated from the allocated capacities according to Algorithm III. It can be seen by comparing the dimensioning results of Algorithms II and III that the dimensioning results using Algorithm II (the Push Down algorithm using the Erlang blocking measure) are close to those obtained using Algorithm III (the adaptive dimensioning algorithm using the Entropy Rate Function). Consequently, it is clear that the dimensioning problem is insensitive to the choice of the blocking measure.

TABLE 4

| | $VP_1$ | $VP_2$ | $VP_3$ | $VP_4$ | $VP_5$ | $VP_6$ | $VP_7$ | $VP_8$ | $VP_9$ | $VP_{10}$ |
|---|---|---|---|---|---|---|---|---|---|---|
| TRAFFIC DEMAND | 4 | 6 | 3 | 1 | 6 | 4 | 3 | 6 | 5 | 2 |
| | | | | VIRTUAL PATH CAPACITY | | | | | | |
| ALGORITHM I | 9.89 | 13.64 | 7.99 | 5.10 | 12.86 | 10.44 | 7.99 | 13.64 | 11.24 | 7.16 |
| ALGORITHM II | 9.75 | 13.53 | 6.19 | 5.29 | 12.64 | 10.50 | 8.19 | 13.53 | 11.18 | 7.11 |
| ALGORITHM III | 9.72 | 13.83 | 8.07 | 4.79 | 12.82 | 10.59 | 8.07 | 13.83 | 11.30 | 6.96 |
| | | | | ERLANG BLOCKIN PROBABILITY (%) | | | | | | |
| ALGORITHM I | 0.623 | 0.330 | 0.863 | 0.443 | 0.607 | 0.388 | 0.863 | 0.330 | 0.715 | 0.350 |
| ALGORITHM II | 0.743 | 0.366 | 0.743 | 0.366 | 0.743 | 0.366 | 0.743 | 0.366 | 0.743 | 0.366 |
| ALGORITHM III | 0.768 | 0.275 | 0.818 | 0.890 | 0.635 | 0.338 | 0.818 | 0.275 | 0.689 | 0.439 |

TABLE 5

| LINK | $C_{1-2}$ | $C_{2-6}$ | $C_{1-6}$ | $C_{2-3}$ | $C_{6-5}$ | $C_{3-5}$ | $C_{3-4}$ | $C_{5-4}$ |
|---|---|---|---|---|---|---|---|---|
| LINK CAPACITY | 50 | 50 | 50 | 50 | 50 | 50 | 50 | 50 |
| | | | | LINK UTILIZATION (%) | | | | |
| ALGORITHM I | 42.28 | 35.92 | 41.60 | 100 | 100 | 36.96 | 35.78 | 54.56 |
| ALGORITHM II | 41.86 | 35.88 | 41.28 | 100 | 100 | 37.40 | 35.88 | 54.14 |
| ALGORITHM III | 42.04 | 35.22 | 41.58 | 100 | 100 | 37.31 | 35.58 | 55.32 |

Algorithm I is a convex programing based algorithm whose objective is to maximize the total carried traffic calculated through the Erlang blocking formula. This algorithm is of the type described in A. Faragó, S. Blaabjerg, W. Holender, T. Henk and S. Malomsoky, *Optimal Virtual Path Bandwidth Management*, a conference preprint that was submitted in May 1994 to ISS'95, which is hereby incorporated by reference herein. Algorithm II is a Push Down algorithm using an Erlang blocking measure of the type described earlier. Algorithm III is the entropy-based VP dimensioning algorithm also previously described.

In order to make the results of the three algorithms comparable, the bandwidth demand parameter, p, was set to have unit value for all three algorithms. Further, the traffic demands, p, were also assumed to have values lower than the physical capacities of the various links.

TABLE 5 presents the corresponding results for link utilization for the various virtual paths. As can be seen from TABLE 5, the $C_{2-3}$ and the $C_{6-5}$ links corresponding to physical links 1612 and 1615 respectively, are critical links, as the utilization rates of these physical links is 100%.

TABLE 6 presents two global performance parameters that both characterize as well as permit the comparison of the three algorithms: the maximum VP blocking probability and the total carried traffic.

TABLE 6

| COMPARISON | ALGORITHM I | ALGORITHM II | ALGORITHM III |
|---|---|---|---|
| MAXIMUM VP BLOCKING PROBABILITY (%) | 0.8639 | 0.7437 | 0.8901 |
| TOTAL CARRIED TRAFFIC | 39.7843 | 39.7748 | 39.7834 |

The performance of the same three algorithms has also been investigated for traffic patterns having a large divergence of traffic demands between the various virtual paths. A comparative tabulation of allocated VP capacity for heterogenous traffic demand resulting in low blocking can be seen in TABLE 7. As is shown in the top row of TABLE 7, the offered traffic on virtual path $V_1$ is significantly different from that on virtual paths $V_2$ to $VP_{10}$.

TABLE 7

|  | $VP_1$ | $VP_2$ | $VP_3$ | $VP_4$ | $VP_5$ | $VP_6$ | $VP_7$ | $VP_8$ | $VP_9$ | $VP_{10}$ |
|---|---|---|---|---|---|---|---|---|---|---|
| TRAFFIC DEMAND | 12 | 1 | 1 | 1 | 2 | 2 | 1 | 2 | 1 | 2 |
| | VIRTUAL PATH CAPACITY | | | | | | | | | |
| ALGORITHM I | 23.80 | 5.73 | 5.73 | 5.73 | 8.00 | 8.00 | 5.73 | 8.00 | 5.73 | 8.00 |
| ALGORITHM II | 23.89 | 8.47 | 5.98 | 8.47 | 8.15 | 10.99 | 5.98 | 10.99 | 5.98 | 10.99 |
| ALGORITHM III | 24.81 | 8.21 | 5.69 | 8.21 | 8.09 | 11.19 | 5.69 | 11.19 | 5.69 | 11.19 |

The corresponding comparison results for link utilization on the 10 virtual paths for the three algorithm are presented in TABLE 8 for the same three algorithms as those considered earlier. As can be seen physical links 1612 and 1618 are critical links when Algorithms II and III are used for dimensioning the network. The comparison of the global performance evaluation parameter for the three algorithms is shown in TABLE 9. The results tabulated in TABLES 7, 8 and 9, illustrate a situation where heterogeneous traffic demand results in low blocking.

TABLE 8

| LINK | $C_{1-2}$ | $C_{2-6}$ | $C_{1-6}$ | $C_{2-3}$ | $C_{6-5}$ | $C_{3-5}$ | $C_{3-4}$ | $C_{5-4}$ |
|---|---|---|---|---|---|---|---|---|
| LINK CAPACITY | 50 | 50 | 50 | 50 | 50 | 50 | 50 | 50 |
| | LINK UTILIZATION (%) | | | | | | | |
| ALGORITHM I | 59.1 | 27.5 | 27.5 | 98 | 71 | 27.5 | 59.1 | 27.5 |
| ALGORITHM II | 59.8 | 33.3 | 38.9 | 100 | 100 | 34.0 | 59.8 | 36.9 |
| ALGORITHM III | 61.0 | 32.6 | 38.8 | 100 | 100 | 33.8 | 61.0 | 36.8 |

TABLE 9

| COMPARISON | ALGORITHM I | ALGORITHM II | ALGORITHM III |
|---|---|---|---|
| TOTAL CARRIED TRAFFIC (SDEMAND = 25) | 24.971 | 24.985 | 24.986 |

In contrast, TABLES 10, 11 and 12 illustrate a situation where heterogeneous offered traffic results in high blocking. TABLE 10 presents results for allocated capacities for the traffic demand shown on the top row. TABLE 11 presents the corresponding link utilization results for the 10 virtual paths. TABLE 12 summarizes a comparative analysis of the three algorithms using the total carried traffic as a global performance evaluation parameter.

TABLE 10

|  | $VP_1$ | $VP_2$ | $VP_3$ | $VP_4$ | $VP_5$ | $VP_6$ | $VP_7$ | $VP_8$ | $VP_9$ | $VP_{10}$ |
|---|---|---|---|---|---|---|---|---|---|---|
| TRAFFIC DEMAND | 16 | 2 | 3 | 20 | 19 | 2 | 4 | 2 | 1 | 2 |
| | VIRTUAL PATH CAPACITY | | | | | | | | | |
| ALGORITHM I | 18.00 | 5.25 | 3.99 | 28.97 | 21.02 | 5.25 | 1.99 | 5.25 | 1.99 | 5.25 |
| ALGORITHM II | 16.98 | 5.65 | 4.75 | 27.37 | 19.71 | 5.65 | 5.73 | 5.65 | 2.82 | 5.65 |
| ALGORITHM III | 18.11 | 5.09 | 3.94 | 28.69 | 21.30 | 5.09 | 5.08 | 5.09 | 1.56 | 5.09 |

TABLE 11

| LINK | $C_{1-2}$ | $C_{2-6}$ | $C_{1-6}$ | $C_{2-3}$ | $C_{6-5}$ | $C_{3-5}$ | $C_{3-4}$ | $C_{5-4}$ |
|---|---|---|---|---|---|---|---|---|
| LINK CAPACITY | 50 | 50 | 50 | 50 | 50 | 50 | 50 | 50 |
| | LINK UTILIZATION (%) | | | | | | | |
| ALGORITHM I | 40.0 | 100 | 21.0 | 100 | 100 | 18.5 | 46.0 | 21.0 |
| ALGORITHM II | 39.6 | 94.2 | 22.6 | 100 | 100 | 20.8 | 45.4 | 22.6 |
| ALGORITHM III | 39.4 | 100 | 20.4 | 100 | 98.1 | 18.1 | 46.4 | 20.4 |

TABLE 12

| COMPARISON | ALGORITHM I | ALGORITHM II | ALGORITHM III |
|---|---|---|---|
| TOTAL CARRIED TRAFFIC (ΣDEMAND = 71) | 64.8137 | 64.2233 | 63.6251 |

As can be seen from TABLES 6, 9 and 12, the three algorithms yield very similar results in terms of their global performance.

Although a preferred embodiment of the method and apparatus of the present invention has been illustrated in the accompanying drawings and described in the foregoing detailed description, it is to be understood that the invention is not limited to the embodiment disclosed, but is capable of numerous rearrangements, modifications and substitutions without departing from the spirit of the invention as set forth and defined by the following claims.

What is claimed is:

1. A computer implemented method of adaptively dimensioning virtual paths defined on a telecommunications network carrying general traffic (FIG. 13), said network having a plurality of interconnected links whose transmission capacities are limited, said dimensioning method comprising the steps of:

choosing an appropriate entropy rate function to model the load on each virtual path of said telecommunications network;

selecting an adaptive solution algorithm using the entropy rate function as a blocking measure that is operative to solve a load balancing problem for said general traffic; and performing computations on a computing system using said load balancing algorithm incorporating said entropy rate function to produce a load distribution on said virtual paths that is as uniform as possible.

2. The adaptive virtual path dimensioning method of claim 1, wherein said entropy rate function is determined by traffic measurements.

3. The adaptive virtual path dimensioning method of claim 1 wherein said entropy rate function is determined by idealizing the characteristics of offered traffic on a telecommunications network.

4. The adaptive virtual path dimensioning method of claim 3 wherein said entropy rate function is idealized for a homogenous Poissonian distribution of offered traffic.

5. The adaptive virtual path dimensioning method of claim 3 wherein said entropy rate function is idealized for a multi-class Poissonian distribution of offered traffic.

6. The adaptive virtual path dimensioning method of claim 3 wherein said entropy rate function is idealized for a Normal distribution of offered traffic.

7. The adaptive virtual path dimensioning method of claim 3 wherein said entropy rate function is idealized for a binomial distribution of offered traffic.

8. The adaptive virtual path dimensioning method of claim 3 wherein the entropy blocking measure used to model the offered traffic is the entropy rate function, $I_x(C)$, said entropy rate function being calculable as the approximation of the negative logarithm of the probability that an arbitrarily distributed random variable, X, is greater than or equal to a preselected value, C, and said entropy rate function additionally being a convex function that reaches its minimum value of zero at the mean of the distribution.

9. The adaptive virtual path dimensioning method of claim 1 wherein said adaptive solution algorithm using the entropy rate function as a blocking measure that is operative to solve a load balancing problem for said general traffic further comprises the following steps:

assembling the virtual paths to be dimensioned into a dimensioning set;

calculating the blocking on each virtual path at every network link traversed by said virtual path using said chosen entropy rate function;

identifying the virtual path having the largest blocking on each network link; and allocating additional capacity to said identified virtual path without violating the network resource constraints till said identified virtual path no longer has the highest blocking, said allocation of additional capacity being performed by an adaptive resource allocation technique comprising the following sub-steps:

reducing the blocking of each of said plurality of virtual paths to a relatively low value using a virtual path dimensioning technique; and then repeating the following iterative substeps until a convergence evaluation criterion is satisfied:

computing the increments to the entropy rate function estimates for each of said physical links using the formula:

$$\Delta I_k^t = \frac{\Delta C_k^t}{\sum_i \left(\frac{1}{s_i}\right)}$$

where $\Delta I_k^t$ is the increment to the entropy rate function estimate for the $k^{th}$ physical link, $\Delta C_k^t$ is the unallocated capacity of said $k^{th}$ physical link, and $s_i$ is the shift parameter for the $i^{th}$ virtual path that traverses said $k^{th}$ physical link;

determining $\Delta I_{MIN}^t$, the minimum of the entropy rate function estimates over all physical links;

calculating a revised estimate for said entropy rate function using the update equation:

$$I^{t+1}(s_i^{t+1}) = I^t(s_i^t) + \Delta I_{MIN}^t$$

where t is an iteration step index, $I^{t+1}$ is the revised estimate of the entropy rate function and $I^t$ is the current estimate of the entropy rate function; and calculating a revised estimate for the shift parameter, s, using the update equation:

$$s_i^{t+1} = s_i^t + \Delta s_i^t$$

where t is said iteration step index, $s_i^{t+1}$ is the revised estimate of said shift parameter for the $i^{th}$ virtual path and $s_i^t$ is the current estimate of said entropy rate function for said $i^{th}$ virtual path.

10. The adaptive virtual path dimensioning method of claim 9, wherein said sub-step of reducing the blocking of each of said plurality of virtual paths to a relatively low value is performed using a push down algorithm (FIG. 9).

11. The adaptive virtual path dimensioning method of claim 9, wherein said step of calculating a revised estimate for the shift parameters s, using the update equation:

$$s_i^{t+1} = s_i^t + \Delta s_i^t$$

is performed by using the following approximation for $\Delta s_i$:

$$\Delta s_i^t = \frac{\Delta I_k^t}{s_i^t V_i^t(s)}$$

where $V_i^t(s)$ is the current estimate of the variance of the shifted distribution for the $i^{th}$ virtual path.

12. A method for adaptively dimensioning virtual paths defined on a telecommunications network having a plurality of physical links interconnecting a plurality of nodes, said method comprising the steps of:

mapping said plurality of physical links into one or more virtual paths, each of said virtual paths providing an individually switchable connection between a pair of nodes in the telecommunications network;

specifying the transmission capacity of each physical link;

assembling a selected plurality of said virtual paths into a dimensioning set;

allocating initial values of transmission capacity to each virtual path in said dimensioning set using the entropy rate function as a blocking measure, each of said initial values being equal and chosen so that the blocking is large;

recursively identifying as critical links those physical links whose capacities are fully allocated to the virtual paths traversing them, by the following sub-steps:

calculating the capacity to be allocated to each virtual path using the preceding estimate for the entropy rate function and the value of the shift parameter computed in the preceding iteration;

summing the capacities allocated to each of said virtual paths traversing a physical link to obtain the total allocated capacity on each of said physical links;

incrementing said entropy rate function estimate by a calculated amount;

recalculating said shift parameter value for each virtual path in said dimensioning set; and comparing said total allocated capacity of each physical link to its specified capacity to determine if all the capacity of each of said physical links has been substantially allocated;

storing the currently allocated capacities on each of the virtual paths that traverses a physical link that has been identified as a critical physical link;

removing all virtual paths that traverse each critical physical link from said dimensioning set; and recomputing the allocable physical capacities of said physical links to compensate for the capacities allocated to those virtual paths that have been removed from said dimensioning set.

13. The adaptive virtual path dimensioning method of claim 12 wherein said step of incrementing the entropy rate function estimate for each of said physical links by a calculated amount is performed using the formula:

$$\Delta I_k^t = \frac{\Delta C_k^t}{\sum_i \left(\frac{1}{s_i}\right)}$$

where $\Delta I_k^t$ is the increment to the entropy rate function estimate for the $k^{th}$ physical link, $\Delta C_k^t$ is the unallocated capacity of said $k^{th}$ physical link, and $s_i$ is the shift parameter for the $i^{th}$ virtual path that traverses said $k^{th}$ physical link.

14. A computer implemented system for adaptively dimensioning virtual paths defined on a telecommunications network carrying general traffic (FIG. 13), said network having a plurality of interconnected links whose transmission capacities are limited, further comprising:

means for choosing an appropriate entropy rate function to model the load on each virtual path of said telecommunications network;

means for selecting an adaptive solution algorithm using the entropy rate function as a blocking measure that is operative to solve a load balancing problem for said general traffic; and means for performing computations on a computing system using said load balancing algorithm incorporating said entropy rate function to produce a load distribution on said virtual paths that is as uniform as possible.

15. The adaptive virtual path dimensioning system of claim 14, wherein said entropy rate function is determined by traffic measurements.

16. The adaptive virtual path dimensioning system of claim 14 wherein said entropy rate function is determined by idealizing the characteristics of offered traffic on a telecommunications network.

17. The adaptive virtual path dimensioning system of claim 16 wherein said entropy rate function is idealized for a homogenous Poissonian distribution of offered traffic.

18. The adaptive virtual path dimensioning system of claim 16 wherein said entropy rate function is idealized for a multi-class Poissonian distribution of offered traffic.

19. The adaptive virtual path dimensioning system of claim 16 wherein said entropy rate function is idealized for a Normal distribution of offered traffic.

20. The adaptive virtual path dimensioning system of claim 16 wherein said entropy rate function is idealized for a binomial distribution of offered traffic.

21. The adaptive virtual path dimensioning system of claim 16 wherein the entropy blocking measure used to model the offered traffic is the entropy rate function, $I_x(C)$, said entropy rate function being calculable as the approximation of the negative logarithm of the probability that an arbitrarily distributed random variable, X, is greater than or equal to a preselected value, C, and said entropy rate function additionally being a convex function that reaches its minimum value of zero at the mean of the distribution.

22. The adaptive virtual path dimensioning system of claim 14 wherein said adaptive solution algorithm using the entropy rate function as a blocking measure that is operative to solve a load balancing problem for said general traffic further comprises:

means for assembling the virtual paths to be dimensioned into a dimensioning set;

means for calculating the blocking on each virtual path at every network link traversed by said virtual path using said chosen entropy rate function;

means for identifying the virtual path having the largest blocking on each network link; and means for allocating additional capacity to said identified virtual path without violating the network resource constraints till said identified virtual path no longer has the highest blocking, said means for allocating additional capacity using an adaptive resource allocation technique further comprising:

means for reducing the blocking of each of said plurality of virtual paths to a relatively low value using a virtual path dimensioning technique; and means for repeating iterative sub-steps within the following means until a convergence evaluation criterion is satisfied:

means for computing the increments to the entropy rate function estimates for each of said physical links using the formula:

$$\Delta I_k^t = \frac{\Delta C_k^t}{\sum_i \left(\frac{1}{s_i}\right)}$$

where $\Delta I_k^t$ is the increment to the entropy rate function estimate for the $k^{th}$ physical link, $\Delta C_k^t$ is the unallocated capacity of said $k^{th}$ physical link, and $s_i$ is the shift parameter for the $i^{th}$ virtual path that traverses said $k^{th}$ physical link;

means for determining $\Delta I_{MIN}^t$, the minimum of the entropy rate function estimates over all physical links;

means for calculating a revised estimate for said entropy rate function using the update equation:

$$I^{t+1}(s_i^{t+1}) = I^t(s_i^t) + \Delta I_{MIN}^t$$

where t is an iteration step index, $I^{t+1}$ is the revised estimate of the entropy rate function and $I^t$ is the current estimate of the entropy rate function; and means for calculating a revised estimate for the shift parameter, s, using the update equation:

$$s_i^{t+1}=s_i^t+\Delta s_i^t$$

where t is said iteration step index, $s_i^{t+1}$ is the revised estimate of said shift parameter for the $i^{th}$ virtual path and $s_i^t$ is the current estimate of said entropy rate function for said $i^{th}$ virtual path; and means for performing computations on a computing system using said load balancing algorithm incorporating said entropy rate function to produce a load distribution on said virtual paths that is as uniform as possible.

23. The adaptive virtual path dimensioning system of claim 22, wherein said means for reducing the blocking of each of said plurality of virtual paths to a relatively low value further comprises a push down algorithm (FIG. 9).

24. The adaptive virtual path dimensioning system of claim 22, wherein said means for calculating a revised estimate for the shift parameter, s, using the update equation:

$$s_i^{t+1}=s_i^t+\Delta s_i^t$$

is performed by using the following approximation for $\Delta s_i$:

$$\Delta I_k^t = \frac{\Delta C_k^t}{\sum_i \left(\frac{1}{s_i}\right)}$$

where $V_i^t(s)$ is the current estimate of the variance of the shifted distribution for the $i^{th}$ virtual path.

25. A system for adaptively dimensioning virtual paths defined on a telecommunications network having a plurality of physical links interconnecting a plurality of nodes comprising:

means for mapping said plurality of physical links into one or more virtual paths, each of said virtual paths providing an individually switchable connection between a pair of nodes in the telecommunications network;

means for specifying the transmission capacity of each physical link;

means for assembling a selected plurality of said virtual paths into a dimensioning set;

means for allocating initial values of transmission capacity to each virtual path in said dimensioning set using the entropy rate function as a blocking measure, each of said initial values being equal and chosen so that the blocking is large;

means for recursively identifying as critical links those physical links whose capacities are fully allocated to the virtual paths traversing them further comprising:

means for calculating the capacity to be allocated to each virtual path using the preceding estimate for the entropy rate function and the value of the shift parameter computed in the preceding iteration;

means for summing the capacities allocated to each of said virtual paths traversing a physical link to obtain the total allocated capacity on each of said physical links;

means for incrementing said entropy rate function estimate by a calculated amount;

means for recalculating said shift parameter value for each virtual path in said dimensioning set; and means for comparing said total allocated capacity of each physical link to its specified capacity to determine if all the capacity of each of said physical links has been substantially allocated;

means for storing the currently allocated capacities on each of the virtual paths that traverses a physical link that has been identified as a critical physical link;

means for removing all virtual paths that traverse each critical physical link from said dimensioning set; and means for recomputing the allocable physical capacities of said physical links to compensate for the capacities allocated to those virtual paths that have been removed from said dimensioning set.

26. The adaptive virtual path dimensioning system of claim 25 wherein said means for incrementing the entropy rate function estimate for each of said physical links by a calculated amount using the formula:

$$\Delta I_k^t = \frac{\Delta C_k^t}{\sum_i \left(\frac{1}{s_i}\right)}$$

where $\Delta I_k^t$ is the increment to the entropy rate function estimate for the $k^{th}$ physical link, $\Delta C_k^t$ is the unallocated capacity of said $k^{th}$ physical link, and $s_i$ is the shift parameter for the $i^{th}$ virtual path that traverses said physical link.

27. A computer implemented method of adaptively dimensioning virtual paths defined on a telecommunications network carrying general traffic (FIG. 13), said telecommunications network comprising a plurality of interconnected links whose transmission capacities are limited, said dimensioning method comprising the steps of:

choosing an appropriate entropy rate function to model the load on each virtual path of said telecommunications network;

selecting an adaptive solution algorithm using the entropy rate function as a blocking measure that is operative to solve the load balancing problem for said general traffic, wherein said adaptive solution algorithm further comprises the following sub-steps:

assembling the virtual paths to be dimensioned into a dimensioning set;

calculating the blocking on each virtual path at every network link traversed by said virtual path using said chosen entropy rate function;

identifying the virtual path having the largest blocking on each network link; and allocating additional capacity to said identified virtual path without violating the network resource constraints till said identified virtual path no longer has the highest blocking, said allocation of additional capacity being performed by an adaptive resource allocation technique comprising the following sub-steps:

reducing the blocking of each of said plurality of virtual paths to a relatively low value using a virtual path dimensioning technique; and then repeating the following iterative sub-steps until a convergence evaluation criterion is satisfied:

computing the increments to the entropy rate function estimates for each of said physical links using the formula:

$$\Delta I_k^t = \frac{\Delta C_k^t}{\sum_i \left(\frac{1}{s_i}\right)}$$

where $\Delta I_k^t$ is the increment to the entropy rate function estimate for the $k^{th}$ physical link, 66 $C_k^t$ is the unallocated capacity of said $k^{th}$ physical link, and $s_i$ is the shift parameter for the $i^{th}$ virtual path that traverses said $k^{th}$ physical link;

determining $\Delta I_{MIN}^t$, the lowest value of the entropy rate function estimates over all physical links;

calculating a revised estimate for said entropy rate function using the update equation:

$$I^{t+1}(s_i^{t+1})=I^t(s_i^t)+\Delta I_{MIN}^t$$

where t is an iteration step index, $I^{t+1}$ is the revised estimate of the entropy rate function and $I^t$ is the current estimate of the entropy rate function; and calculating a revised estimate for the shift parameter, s, using the update equation:

$$s_i^{t+1}=s_i^t+\Delta s_i^t$$

where t is said iteration step index, $s_i^{t+1}$ is the revised estimate of the shift parameter for the $i^{th}$ virtual path and $s_i^t$ is the current estimate of the entropy rate function for said $i^{th}$ virtual path; and performing computations on a computing system using said load balancing algorithm incorporating said entropy rate function to produce a load distribution on said virtual paths that is as uniform as possible.

28. The adaptive virtual path dimensioning method of claim 27, wherein said sub-step of reducing the blocking of each of said plurality of virtual paths to a relatively low value is performed using a push down algorithm (FIG. 9).

29. The adaptive virtual path dimensioning method of claim 27, wherein said step of calculating a revised estimate for the shift parameter, s, using the update equation: $s_i^{t+1}=s_i^t+\Delta s_i^t$ is performed by using the following approximation for $\Delta s_i$:

$$\Delta I_k^t = \frac{\Delta C_k^t}{\sum_i \left(\frac{1}{s_i}\right)}$$

where $V_i^t(s)$ is the current estimate of the variance of the shifted distribution for the $i^{th}$ virtual path.

30. A method for adaptively dimensioning virtual paths defined on a telecommunications network having a plurality of physical links interconnecting a plurality of nodes, said method comprising the steps of:

mapping said plurality of physical links into one or more virtual paths, each of said virtual paths providing an individually switchable connection between a pair of nodes in the telecommunications network;

specifying the transmission capacity of each physical link;

assembling a selected plurality of said virtual paths into a dimensioning set;

allocating initial values of transmission capacity to each virtual path in said dimensioning set using the entropy rate function as a blocking measure, each of said initial values being equal and chosen so that the blocking is large;

recursively identifying as critical links those physical links whose capacities are fully allocated to the virtual paths traversing them, by the following sub-steps:

calculating the capacity to be allocated to each virtual path using the preceding estimate for the entropy rate function and the value of the shift parameter computed in the preceding iteration;

summing the capacities allocated to each of said virtual paths traversing a physical link to obtain the total allocated capacity on each of said physical links;

incrementing said entropy rate function estimate for each of said physical links by a calculated amount using the formula:

$$\Delta I_k^t = \frac{\Delta C_k^t}{\sum_i \left(\frac{1}{s_i}\right)}$$

where $\Delta I_k^t$ is the increment to the entropy rate function estimate for the $k^{th}$ physical link, $\Delta C_k^t$ is the unallocated capacity of said $k^{th}$ physical link, and $s_i$ is the shift parameter for the $i^{th}$ virtual path that traverses said $k^{th}$ physical link;

recalculating said shift parameter value for each virtual path in said dimensioning set; and comparing said total allocated capacity of each physical link to its specified capacity to determine if all the capacity of each of said physical links has been substantially allocated;

storing the currently allocated capacities on each of the virtual paths that traverses a physical link that has been identified as a critical physical link;

removing all virtual paths that traverse each critical physical link from said dimensioning set; and recomputing the allocable physical capacities of the physical links to compensate for the capacities allocated to those virtual paths that have been removed from said dimensioning set.

31. A computer implemented system for adaptively dimensioning virtual paths defined on a telecommunications network carrying general traffic (FIG. 13), said network having a plurality of interconnected links whose transmission capacities are limited, further comprising:

means for choosing an appropriate entropy rate function to model the load on each virtual path of said telecommunications network;

means for selecting an adaptive solution algorithm using the entropy rate function as a blocking measure that is operative to solve a load balancing problem for said general traffic, further comprising:

means for assembling the virtual paths to be dimensioned into a dimensioning set;

means for calculating the blocking on each virtual path at every network link traversed by said virtual path using said chosen entropy rate function;

means for identifying the virtual path having the largest blocking on each network link; and means for allocating additional capacity to said identified virtual path without violating the network resource constraints till said identified virtual path no longer has the highest blocking, said means for allocating additional capacity using an adaptive resource allocation technique further comprising:

means for reducing the blocking of each of said plurality of virtual paths to a relatively low value using a virtual path dimensioning technique; and means for repeating iterative sub-steps within the following means until a convergence evaluation criterion is satisfied:

means for computing the increments to the entropy rate function estimates for each of said physical links using the formula:

$$\Delta I_k^t = \frac{\Delta C_k^t}{\sum_i \left( \frac{1}{s_i} \right)}$$

where $\Delta I_k^t$ is the increment to the entropy rate function estimate for the $k^{th}$ physical link, $\Delta C_k^t$ is the unallocated capacity of said $k^{th}$ physical link, and $s_i$ is the shift parameter for the $i^{th}$ virtual path that traverses said $k^{th}$ physical link;

means for determining $\Delta I_{MIN}^t$, the lowest value of the entropy rate function estimate over all physical links;

means for calculating a revised estimate for said entropy rate function using the update equation:

$$I^{t+1}(s_i^{t+1}) = I^t(s_i^t) + \Delta I_{MIN}^t$$

where t is an iteration step index, $I^{t+1}$ is the revised estimate of the entropy rate function and $I^t$ is the current estimate of the entropy rate function; and means for calculating a revised estimate for the shift parameter, s, using the update equation:

$$s_i^{t+1} = s_i^t + \Delta s_i^t$$

where t is said iteration step index, $s_i^{t+1}$ is the revised estimate of the shift parameter for the $i^{th}$ virtual path and $s_i^t$ is the current estimate of the entropy rate function for said $i^{th}$ virtual path; and means for performing computations on a computing system using said load balancing algorithm incorporating said entropy rate function to produce a load distribution on said virtual paths that is as uniform as possible.

32. The adaptive virtual path dimensioning system of claim 31, wherein said means for reducing the blocking of each of said plurality of virtual paths to a relatively low value further comprises a push down algorithm (FIG. 9).

33. The adaptive virtual path dimensioning system of claim 32, wherein said means for calculating a revised estimate for the shift parameter, s, using the update equation:

$$s_i^{t+1} = s_i^t + \Delta s_i^t$$

is performed by using the following approximation for $\Delta s_i$:

$$\Delta I_k^t = \frac{\Delta C_k^t}{\sum_i \left( \frac{1}{s_i} \right)}$$

where $V_i^t(s)$ is the current estimate of the variance of the shifted distribution for the $i^{th}$ virtual path.

34. A system for adaptively dimensioning virtual paths defined on a telecommunications network having a plurality of physical links interconnecting a plurality of nodes comprising:

means for mapping said plurality of physical links into one or more virtual paths, each of said virtual paths providing an individually switchable connection between a pair of nodes in the telecommunications network;

means for specifying the transmission capacity of each physical link;

means for assembling a selected plurality of said virtual paths into a dimensioning set;

means for allocating initial values of transmission capacity to each virtual path in said dimensioning set using the entropy rate function as a blocking measure, each of said initial values being equal and chosen so that the blocking is large;

means for recursively identifying as critical links those physical links whose capacities are fully allocated to the virtual paths traversing them, further comprising:

means for calculating the capacity to be allocated to each virtual path using the preceding estimate for the entropy rate function and the value of the shift parameter computed in the preceding iteration;

means for summing the capacities allocated to each of said virtual paths traversing a physical link to obtain the total allocated capacity on each of said physical links;

means for incrementing said entropy rate function estimate for each of said physical links by a calculated amount using the formula:

$$\Delta I_k^t = \frac{\Delta C_k^t}{\sum_i \left( \frac{1}{s_i} \right)}$$

where $\Delta I_k^t$ is the increment to the entropy rate function estimate for the $k^{th}$ physical link, $\Delta C_k^t$ is the unallocated capacity of said $k^{th}$ physical link, and $s_i$ is the shift parameter for the $i^{th}$ virtual path that traverses said $k^{th}$ physical link;

means for recalculating said shift parameter value for each virtual path in said dimensioning set; and means for comparing said total allocated capacity of each physical link to its specified capacity to determine if all the capacity of each of said physical links has been substantially allocated;

means for storing the currently allocated capacities on each of the virtual paths that traverse a physical link that has been identified as a critical physical link;

means for removing all virtual paths that traverse each critical physical link from said dimensioning set; and means for recomputing the allocable physical capacities of said physical links to compensate for the capacities allocated to those virtual paths that have been removed from said dimensioning set.

35. The adaptive virtual path dimensioning method of claim 1 wherein said adaptive solution algorithm using the entropy rate function as a blocking measure that is operative to solve a load balancing problem for said general traffic further comprises the following steps:

assembling the virtual paths to be dimensioned into a dimensioning set;

calculating the blocking on each virtual path at every network link traversed by said virtual path using said chosen entropy rate function;

identifying the virtual path having the largest blocking on each network link; and allocating additional capacity to said identified virtual path without violating the network resource constraints till said identified virtual path no longer has the highest blocking.

36. The adaptive virtual path dimensioning method of claim 35 wherein said step of allocating additional capacity to said identified virtual path without violating the network resource constraints is performed by an adaptive resource allocation technique comprising the following sub-steps:

reducing the blocking of each of said plurality of virtual paths to a relatively low value using a virtual path dimensioning technique; and then repeating an iterative procedure until a convergence evaluation criterion is satisfied.

37. The adaptive virtual path dimensioning method of claim 36 wherein said iterative procedure within said adaptive resource allocation technique further comprises the following sub-steps:

computing the increments to the entropy rate function estimates for each of said physical links using the formula:

$$\Delta I_k^t = \frac{\Delta C_k^t}{\sum_i \left(\frac{1}{s_i}\right)}$$

where $\Delta I_k^t$ is the increment to the entropy rate function estimate for the $k^{th}$ physical link, $\Delta C_k^t$ is the unallocated capacity of said $k^{th}$ physical link, and $s_i$ is the shift parameter for the $i^{th}$ virtual path that traverses said $k^{th}$ physical link;

determining $\Delta I_{MIN}^t$, the minimum of the entropy rate function estimates over all physical links;

calculating a revised estimate for said entropy rate function using the update equation:

$$I^{t+1}(s_i^{t+1}) = I^t(s_i^t) + \Delta I_{MIN}^t$$

where t is an iteration step index, $I^{t+1}$ is the revised estimate of the entropy rate function and $I^t$ is the current estimate of the entropy rate function; and calculating a revised estimate for the shift parameter, s, using the update equation:

$$s_i^{t+1} = s_i^t + \Delta s_i^t$$

where t is said iteration step index, $s_i^{t+1}$ is the revised estimate of said shift parameter for the $i^{th}$ virtual path and $s_i^t$ is the current estimate of said entropy rate function for said $i^{th}$ virtual path.

38. The adaptive virtual path dimensioning system of claim 14 wherein said adaptive solution algorithm using the entropy rate function as a blocking measure that is operative to solve a load balancing problem for said general traffic further comprises:

means for assembling the virtual paths to be dimensioned into a dimensioning set;

means for calculating the blocking on each virtual path at every network link traversed by said virtual path using said chosen entropy rate function;

means for identifying the virtual path having the largest blocking on each network link; and means for allocating additional capacity to said identified virtual path without violating the network resource constraints till said identified virtual path no longer has the highest blocking.

39. The adaptive virtual path dimensioning system of claim 38 wherein said means for allocating additional capacity to said identified virtual path without violating the network resource constraints includes an adaptive resource allocation technique further comprising:

means for reducing the blocking of each of said plurality of virtual paths to a relatively low value using a virtual path dimensioning technique; and means for repeating an iterative procedure until a convergence evaluation criterion is satisfied.

40. The adaptive virtual path dimensioning system of claim 39 wherein said means for repeating an iterative procedure within said adaptive resource allocation technique further comprises:

means for computing the increments to the entropy rate function estimates for each of said physical links using the formula:

$$\Delta I_k^t = \frac{\Delta C_k^t}{\sum_i \left(\frac{1}{s_i}\right)}$$

where $\Delta I_k^1$ is the increment to the entropy rate function estimate for the $k^{th}$ physical link, $\Delta C_k^t$ is the unallocated capacity of said $k^{th}$ physical link, and $s_i$ is the shift parameter for the $i^{th}$ virtual path that traverses said $k^{th}$ physical link;

means for determining $\Delta I_{MIN}^t$, the minimum of the entropy rate function estimates over all physical links;

means for calculating a revised estimate for said entropy rate function using the update equation:

$$I^{t+1}(s_i^{t+1}) = I^t(s_i^t) + \Delta I_{MIN}^t$$

where t is an iteration step index, $I^{t+1}$ is the revised estimate of the entropy rate function and $I^t$ is the current estimate of the entropy rate function; and means for calculating a revised estimate for the shift parameter, s, using the update equation:

$$s_i^{t+1} = s_i^t + \Delta s_i^t$$

where t is said iteration step index, $s_i^{t+1}$ is the revised estimate of said shift parameter for the $i^{th}$ virtual path and $s_i^t$ is the current estimate of said entropy rate function for said $i^{th}$ virtual path.

* * * * *

UNITED STATES PATENT AND TRADEMARK OFFICE
CERTIFICATE OF CORRECTION

PATENT NO.   : 5,727,051
DATED        : March 10, 1998
INVENTOR(S)  : Wlodek Holender It is certified that error appears in the above-identified patent and that said Letters Patent is hereby corrected as shown below:

Column 1,
Line 12, replace "Szaboics" with -- Szabolcs --

Column 7,
Table 1, replace Row "A   2   _   D   _" with Row -- A   2   _   D   6 --

Column 8,
Lines 6-7, replace "demuiti-plexing" with -- multi-plexing --

Column 15,
Line 36, (EQN. 12), replace "$C = \mu'(s) = \rho pe$" with -- $C = \mu'(s) = \rho pe^{sp}$ --

Column 20,
Line 7, replace "$P(X \geq C)$" with -- $P(X > C)$ --

Column 23,
Line 57, replace "f," with -- I, --

Column 25,
Line 46, (EQN. 32A),

Replace "$\Delta I_k^t = \dfrac{\overline{C}_{phys}^k - \left(C_i^t + C_2^t\right)}{\dfrac{1}{s_1^t} + \dfrac{1}{s_2^t}}$"

With -- $\Delta I_k^t = \dfrac{\overline{C}_{phys}^k - \left(C_1^t + C_2^t\right)}{\dfrac{1}{s_1^t} + \dfrac{1}{s_2^t}}$ --

UNITED STATES PATENT AND TRADEMARK OFFICE
CERTIFICATE OF CORRECTION

PATENT NO.   : 5,727,051
DATED        : March 10, 1998
INVENTOR(S)  : Wlodek Holender It is certified that error appears in the above-identified patent and that said Letters Patent is hereby corrected as shown below:

Column 27,
Line 48, replace "programing" with -- programming --

Column 30,
Table 12, under ALGORITHM III, replace "63,6251" with -- 64,6251 --

Column 35,
Claim 24,

Replace "$\Delta I_k^t = \dfrac{\Delta C_k^t}{\sum_i \left(\dfrac{1}{s}\right)}$"

With -- $\Delta s_i^t = \dfrac{\Delta I_k^t}{s_i^t V_i^t(s)}$ --

Column 37,
Claim 29,

Replace "$\Delta I_k^t = \dfrac{\Delta C_k^t}{\sum_i \left(\dfrac{1}{s}\right)}$"

With -- $\Delta s_i^t = \dfrac{\Delta I_k^t}{s_i^t V_i^t(s)}$ --

UNITED STATES PATENT AND TRADEMARK OFFICE
CERTIFICATE OF CORRECTION

PATENT NO. : 5,727,051
DATED : March 10, 1998
INVENTOR(S) : Wlodek Holender

It is certified that error appears in the above-identified patent and that said Letters Patent is hereby corrected as shown below:

Column 39,
Claim 33,

Replace "$\Delta I_k^t = \dfrac{\Delta C_k^t}{\sum_i \left(\dfrac{1}{s}\right)}$"

With -- $\Delta s_i^t = \dfrac{\Delta I_k^t}{s_i^t V_i^t(s)}$ --

Signed and Sealed this

Twenty-fifth Day of March, 2003

JAMES E. ROGAN
*Director of the United States Patent and Trademark Office*